(12) United States Patent
Sheeder et al.

(10) Patent No.: US 12,327,573 B2
(45) Date of Patent: Jun. 10, 2025

(54) IDENTIFYING INPUT FOR SPEECH RECOGNITION ENGINE

(71) Applicant: Magic Leap, Inc., Plantation, FL (US)

(72) Inventors: Anthony Robert Sheeder, Fort Lauderdale, FL (US); Tushar Arora, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/850,965

(22) Filed: Apr. 16, 2020

(65) Prior Publication Data
US 2020/0335128 A1 Oct. 22, 2020

Related U.S. Application Data

(60) Provisional application No. 62/836,593, filed on Apr. 19, 2019.

(51) Int. Cl.
*G10L 25/87* (2013.01)
*G10L 15/22* (2006.01)

(52) U.S. Cl.
CPC .............. *G10L 25/87* (2013.01); *G10L 15/22* (2013.01); *G10L 2015/227* (2013.01)

(58) Field of Classification Search
CPC ......... G10L 15/22; G10L 25/78; G10L 25/87; G10L 15/04; G10L 15/05;
(Continued)

(56) References Cited

U.S. PATENT DOCUMENTS 4,158,750 A 6/1979 Sakoe
4,852,988 A 8/1989 Velez
(Continued)

FOREIGN PATENT DOCUMENTS

CA 2316473 A1 1/2001
CA 2362895 A1 12/2002
(Continued)

OTHER PUBLICATIONS

Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
(Continued)

*Primary Examiner* — Richemond Dorvil
*Assistant Examiner* — Rodrigo A Chavez
(74) *Attorney, Agent, or Firm* — Morrison & Foerster LLP

(57) ABSTRACT

A method of presenting a signal to a speech recognition engine is disclosed. According to an example of the method, an audio signal is received from a user. A portion of the audio signal is identified, the portion having a first time and a second time. A pause in the portion of the audio signal, the pause comprising the second time, is identified. It is determined whether the pause indicates the completion of an utterance of the audio signal. In accordance with a determination that the pause indicates the completion of the utterance, the portion of the audio signal is presented as input to the speech recognition engine. In accordance with a determination that the pause does not indicate the completion of the utterance, the portion of the audio signal is not presented as input to the speech recognition engine.

41 Claims, 12 Drawing Sheets

(58) Field of Classification Search
CPC ... G10L 2015/227; G10L 15/24; G10L 15/25; G06F 3/167; G06F 3/013
USPC .......................................... 704/210, 248, 253
See application file for complete search history.

(56) References Cited

U.S. PATENT DOCUMENTS

| | | |
|---|---|---|
| 6,433,760 B1 | 8/2002 | Vaissie |
| 6,491,391 B1 | 12/2002 | Blum et al. |
| 6,496,799 B1 | 12/2002 | Pickering |
| 6,738,482 B1 | 5/2004 | Jaber |
| 6,820,056 B1 | 11/2004 | Harif |
| 6,847,336 B1 | 1/2005 | Lemelson |
| 6,943,754 B2 | 9/2005 | Aughey |
| 6,977,776 B2 | 12/2005 | Volkenandt et al. |
| 7,346,654 B1 | 3/2008 | Weiss |
| 7,347,551 B2 | 3/2008 | Fergason et al. |
| 7,488,294 B2 | 2/2009 | Torch |
| 7,587,319 B2 | 9/2009 | Catchpole |
| 7,979,277 B2 | 7/2011 | Larri et al. |
| 8,154,588 B2 | 4/2012 | Burns |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-zeev et al. |
| 9,294,860 B1 | 3/2016 | Carlson |
| 9,323,325 B2 | 4/2016 | Perez et al. |
| 9,715,875 B2 | 7/2017 | Piernot |
| 9,720,505 B2 | 8/2017 | Gribetz et al. |
| 10,013,053 B2 | 7/2018 | Cederlund et al. |
| 10,025,379 B2 | 7/2018 | Drake et al. |
| 10,062,377 B2 | 8/2018 | Larri et al. |
| 10,134,425 B1 | 11/2018 | Johnson, Jr. |
| 10,289,205 B1* | 5/2019 | Sumter ............... G06F 3/0346 |
| 10,839,789 B2 | 11/2020 | Larri et al. |
| 10,971,140 B2 | 4/2021 | Catchpole |
| 11,151,997 B2 | 10/2021 | Sugiyama et al. |
| 11,328,740 B2 | 5/2022 | Lee et al. |
| 11,587,563 B2 | 2/2023 | Sheeder et al. |
| 11,790,935 B2 | 10/2023 | Lee et al. |
| 11,854,550 B2 | 12/2023 | Sheeder |
| 11,854,566 B2 | 12/2023 | Leider |
| 11,917,384 B2 | 2/2024 | Roach |
| 12,094,489 B2 | 9/2024 | Lee |
| 12,238,496 B2 | 2/2025 | Roach et al. |
| 12,243,531 B2 | 3/2025 | Sheeder et al. |
| 2001/0055985 A1 | 12/2001 | Matt et al. |
| 2003/0030597 A1 | 2/2003 | Geist |
| 2005/0033571 A1 | 2/2005 | Huang |
| 2005/0069852 A1 | 3/2005 | Janakiraman |
| 2006/0023158 A1 | 2/2006 | Howell et al. |
| 2006/0072767 A1 | 4/2006 | Zhang et al. |
| 2006/0098827 A1 | 5/2006 | Paddock et al. |
| 2006/0178876 A1 | 8/2006 | Sato et al. |
| 2007/0225982 A1 | 9/2007 | Washio |
| 2008/0124690 A1* | 5/2008 | Redlich ............... G09B 7/00 434/236 |
| 2008/0201138 A1 | 8/2008 | Visser et al. |
| 2009/0180626 A1 | 7/2009 | Nakano |
| 2010/0245585 A1 | 9/2010 | Fisher et al. |
| 2010/0323652 A1 | 12/2010 | Visser et al. |
| 2011/0211056 A1 | 9/2011 | Publicover et al. |
| 2011/0213664 A1 | 9/2011 | Osterhout |
| 2011/0238407 A1 | 9/2011 | Kent |
| 2011/0288860 A1 | 11/2011 | Schevciw et al. |
| 2012/0021806 A1 | 1/2012 | Maltz |
| 2012/0130713 A1 | 5/2012 | Shin et al. |
| 2012/0209601 A1 | 8/2012 | Jing |
| 2013/0077147 A1 | 3/2013 | Efimov |
| 2013/0204607 A1* | 8/2013 | Baker, IV ............... G10L 17/00 704/235 |
| 2013/0226589 A1 | 8/2013 | Largey |
| 2013/0236040 A1 | 9/2013 | Crawford |
| 2013/0339028 A1 | 12/2013 | Rosner et al. |
| 2014/0016793 A1 | 1/2014 | Gardner |
| 2014/0194702 A1 | 7/2014 | Tran |
| 2014/0195918 A1 | 7/2014 | Friedlander |
| 2014/0200887 A1 | 7/2014 | Nakadal et al. |
| 2014/0222430 A1 | 8/2014 | Rao |
| 2014/0270202 A1 | 9/2014 | Ivanov et al. |
| 2014/0270244 A1 | 9/2014 | Fan |
| 2014/0310595 A1 | 10/2014 | Acharya et al. |
| 2014/0337023 A1 | 11/2014 | Mcculloch et al. |
| 2014/0379336 A1 | 12/2014 | Bhatnagar |
| 2015/0006181 A1 | 1/2015 | Fan et al. |
| 2015/0168731 A1 | 6/2015 | Robbins |
| 2015/0310857 A1 | 10/2015 | Habets et al. |
| 2015/0348572 A1 | 12/2015 | Thornburg et al. |
| 2016/0019910 A1 | 1/2016 | Faubel et al. |
| 2016/0066113 A1 | 3/2016 | Elkhatib et al. |
| 2016/0112817 A1 | 4/2016 | Fan et al. |
| 2016/0142830 A1 | 5/2016 | Hu |
| 2016/0165340 A1 | 6/2016 | Benattar |
| 2016/0180837 A1 | 6/2016 | Gustavsson |
| 2016/0216130 A1 | 7/2016 | Abramson et al. |
| 2016/0217781 A1 | 7/2016 | Zhong et al. |
| 2016/0284350 A1 | 9/2016 | Yun et al. |
| 2016/0358598 A1* | 12/2016 | Williams ............... G10L 17/02 |
| 2016/0379629 A1 | 12/2016 | Hofer |
| 2016/0379632 A1 | 12/2016 | Hoffmeister |
| 2016/0379638 A1* | 12/2016 | Basye ............... G10L 15/22 704/235 |
| 2017/0078819 A1 | 3/2017 | Habets |
| 2017/0091169 A1 | 3/2017 | Bellegarda |
| 2017/0092276 A1 | 3/2017 | Sun et al. |
| 2017/0110116 A1 | 4/2017 | Tadpatrikar |
| 2017/0148429 A1 | 5/2017 | Hayakawa |
| 2017/0270919 A1 | 9/2017 | Parthasarathi |
| 2017/0280239 A1 | 9/2017 | Sekiya |
| 2017/0316780 A1 | 11/2017 | Lovitt |
| 2017/0330555 A1 | 11/2017 | Kawano |
| 2017/0332187 A1 | 11/2017 | Lin |
| 2018/0011534 A1 | 1/2018 | Poulos et al. |
| 2018/0053284 A1 | 2/2018 | Rodriguez et al. |
| 2018/0077095 A1 | 3/2018 | Deyle et al. |
| 2018/0129469 A1 | 5/2018 | Vennström et al. |
| 2018/0227665 A1 | 8/2018 | Elko et al. |
| 2018/0316939 A1 | 11/2018 | Todd |
| 2018/0336902 A1* | 11/2018 | Cartwright ............. G06F 16/61 |
| 2018/0349946 A1* | 12/2018 | Nguyen ............. G06Q 30/0244 |
| 2018/0358021 A1* | 12/2018 | Mistica ............... G16Z 99/00 |
| 2018/0366114 A1 | 12/2018 | Anbazhagan |
| 2019/0129944 A1 | 5/2019 | Kawano |
| 2019/0362704 A1 | 11/2019 | Nicolis et al. |
| 2019/0362741 A1 | 11/2019 | Li et al. |
| 2019/0373362 A1 | 12/2019 | Ansai et al. |
| 2019/0392641 A1 | 12/2019 | Taylor |
| 2020/0027455 A1* | 1/2020 | Sugiyama ............... G06F 3/16 |
| 2020/0064921 A1* | 2/2020 | Kang ............... G02B 27/01 |
| 2020/0194028 A1 | 6/2020 | Lipman |
| 2020/0213729 A1 | 7/2020 | Soto |
| 2020/0279552 A1 | 9/2020 | Piersol et al. |
| 2020/0279561 A1 | 9/2020 | Sheeder |
| 2020/0286465 A1 | 9/2020 | Wang et al. |
| 2020/0296521 A1* | 9/2020 | Wexler ............... G06F 3/167 |
| 2021/0043223 A1 | 2/2021 | Lee et al. |
| 2021/0056966 A1* | 2/2021 | Bilac ............... G10L 15/1822 |
| 2021/0125609 A1 | 4/2021 | Dusan et al. |
| 2021/0192413 A1* | 6/2021 | Shirazipour ..... G06Q 10/06311 |
| 2021/0264931 A1 | 8/2021 | Leider |
| 2021/0306751 A1 | 9/2021 | Roach et al. |
| 2022/0230658 A1 | 7/2022 | Lee et al. |
| 2023/0135768 A1 | 5/2023 | Sheeder et al. |
| 2023/0386461 A1 | 11/2023 | Leider |
| 2023/0410835 A1 | 12/2023 | Lee |
| 2024/0087565 A1 | 3/2024 | Sheeder |
| 2024/0087587 A1 | 3/2024 | Leider |
| 2024/0163612 A1 | 5/2024 | Roach |

(56) References Cited

U.S. PATENT DOCUMENTS

| | | |
|---|---|---|
| 2024/0420718 A1 | 12/2024 | Audfray |
| 2025/0006219 A1 | 1/2025 | Lee |

FOREIGN PATENT DOCUMENTS

| | | | |
|---|---|---|---|
| CA | 2388766 | A1 | 12/2003 |
| CN | 105529033 | A | 4/2016 |
| EP | 2950307 | A1 | 12/2015 |
| EP | 3211918 | A1 | 8/2017 |
| JP | S52144205 | A | 12/1977 |
| JP | 06075588 | A | 3/1994 |
| JP | 2000148184 | A | 5/2000 |
| JP | 2002135173 | A | 5/2002 |
| JP | 2005196134 | A | 7/2005 |
| JP | 2008242067 | A | 10/2008 |
| JP | 2010273305 | A | 12/2010 |
| JP | 2013183358 | A | 9/2013 |
| JP | 2014137405 | A | 7/2014 |
| JP | 2014178339 | A | 9/2014 |
| JP | 2016004270 | A | 1/2016 |
| JP | 2017211596 | A | 11/2017 |
| JP | 2018523156 | A | 8/2018 |
| JP | 2018179954 | A | 11/2018 |
| WO | 2014113891 | A1 | 7/2014 |
| WO | 2014159581 | A1 | 10/2014 |
| WO | 2015169618 | A1 | 11/2015 |
| WO | 2016063587 | A1 | 4/2016 |
| WO | 2016151956 | A1 | 9/2016 |
| WO | 2016153712 | A1 | 9/2016 |
| WO | 2017003903 | A1 | 1/2017 |
| WO | 2017017591 | A1 | 2/2017 |
| WO | 2017191711 | A1 | 11/2017 |
| WO | 2018163648 | A1 | 9/2018 |
| WO | 2019224292 | A1 | 11/2019 |
| WO | 2020180719 | A1 | 9/2020 |
| WO | 2022072752 | A1 | 4/2022 |
| WO | 2023064875 | A1 | 4/2023 |

OTHER PUBLICATIONS

International Search Report and Written Opinion mailed May 18, 2020, for PCT Application No. PCT/US20/20469, filed Feb. 28, 2020, twenty pages.

Non-Final Office Action mailed Jun. 24, 2021, for U.S. Appl. No. 16/805,337, filed Feb. 28, 2020, fourteen pages.

Bilac, et al. (Nov. 15, 2017). Gaze and Filled Pause Detection for Smooth Human-Robot Conversations. www.angelicalim.com, retrieved on Jun. 17, 2020, Retrieved from the internet URL: http://www.angelicalim.com/papers/humanoids2017_paper.pdf entire document, 13 pages.

International Search Report and Written Opinion mailed Jul. 2, 2020, for PCT Application No. PCT/US2020/028570, filed Apr. 16, 2020, nineteen pages.

Kitayama, et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download?doi=10.1.1.141.1472&rep=rep1&type=pdf entire document, pp. 1237-1240.

Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf, 22 pages.

International Preliminary Report and Patentability mailed Dec. 22, 2020, for PCT Application No. PCT/US2019/038546, 13 pages.

International Search Report and Written Opinion mailed Sep. 17, 2019, for PCT Application No. PCT/US2019/038546, sixteen pages.

Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf, 100 pages.

European Search Report dated Nov. 12, 2021, for EP Application No. 19822754.8, ten pages.

International Search Report and Written Opinion mailed Jan. 24, 2022, for PCT Application No. PCT/US2021/53046, filed Sep. 30, 2021, 15 pages.

Non-Final Office Action mailed Mar. 17, 2022, for U.S. Appl. No. 16/805,337, filed Feb. 28, 2020, sixteen pages.

Notice of Allowance mailed Mar. 3, 2022, for U.S. Appl. No. 16/987,267, filed Aug. 6, 2020, nine pages.

Final Office Action mailed Oct. 6, 2021, for U.S. Appl. No. 16/805,337, filed Feb. 28, 2020, fourteen pages.

International Preliminary Report and Written Opinion mailed Oct. 28, 2021, for PCT Application No. PCT/US2020/028570, filed Apr. 16, 2020, 17 pages.

International Preliminary Report and Written Opinion mailed Sep. 16, 2021, for PCT Application No. PCT/US2020/020469, filed Feb. 28, 2020, nine pages.

Non-Final Office Action mailed Nov. 17, 2021, for U.S. Appl. No. 16/987,267, filed Aug. 6, 2020, 21 pages.

Non-Final Office Action mailed Aug. 10, 2022, for U.S. Appl. No. 17/214,446, filed Mar. 26, 2021, fifteen pages.

Final Office Action mailed Aug. 5, 2022, for U.S. Appl. No. 16/805,337, filed Feb. 28, 2020, eighteen pages.

Final Office Action mailed Jan. 11, 2023, for U.S. Appl. No. 17/214,446, filed Mar. 26, 2021, sixteen pages.

European Search Report dated Oct. 6, 2022, for EP Application No. 20766540.7, nine pages.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Notice of Allowance mailed Nov. 30, 2022, for U.S. Appl. No. 16/805,337, filed Feb. 28, 2020, six pages.

European Search Report dated Nov. 21, 2022, for EP Application No. 20791183.5 nine pages.

Liu, Baiyang, et al.: (Sep. 6, 2015). "Accurate Endpointing with Expected Pause Duration," Interspeech 2015, pp. 2912-2916, retrieved from: https://scholar.google.com/scholar?q=BAIYANG,+Liu+et+al.:+(September+6,+2015).+%22Accurate+endpointing+with+expected+pause+duration,&hl=en&as_sdt=0&as_vis=1&oi=schoiart.

Shannon, Matt et al. (Aug. 20-24, 2017). "Improved End-of-Query Detection for Streaming Speech Recognition", Interspeech 2017, Stockholm, Sweden, pp. 1909-1913.

European Office Action dated Jun. 1, 2023, for EP Application No. 19822754.8, six pages.

Chinese Office Action dated Jun. 2, 2023, for ON Application No. 2020-571488, with English translation, 9 pages.

International Preliminary Report and Written Opinion mailed Apr. 13, 2023, for PCT Application No. PCT/US2021/53046, filed Sep. 30, 2021, nine pages.

Non-Final Office Action mailed Apr. 12, 2023, for U.S. Appl. No. 17/214,446, filed Mar. 26, 2021, seventeen pages.

Non-Final Office Action mailed Apr. 13, 2023, for U.S. Appl. No. 17/714,708, filed Apr. 6, 2022, sixteen pages.

Non-Final Office Action mailed Apr. 27, 2023, for U.S. Appl. No. 17/254,832, filed Dec. 21, 2020, fourteen pages.

Non-Final Office Action mailed Jun. 23, 2023, for U.S. Appl. No. 18/148,221, filed Dec. 29, 2022, thirteen pages.

Notice of Allowance mailed Jul. 31, 2023, for U.S. Appl. No. 17/714,708, filed Apr. 6, 2022, eight pages.

(56) References Cited

OTHER PUBLICATIONS

Final Office Action mailed Aug. 4, 2023, for U.S. Appl. No. 17/254,832, filed Dec. 21. 2020, seventeen pages.
Chinese Office Action dated Dec. 21, 2023, for CN Application No. 201980050714.4, with English translation, eighteen pages.
Japanese Notice of Allowance mailed Dec. 15, 2023, for JP Application No. 2020-571488, with English translation, eight pages.
Japanese Office Action mailed Jan. 30, 2024, for JP Application No. 2021-551538, with English translation, sixteen pages.
Notice of Allowance mailed Dec. 15, 2023, for U.S. Appl. No. 17/214,446, filed Mar. 26, 2021, seven 4 pages.
European Office Action dated Dec. 12, 2023, for EP Application No. 20766540.7, four pages.
International Preliminary Report and Written Opinion mailed Apr. 25, 2024, for PCT Application No. PCT/US2022/078063, seven pages.
International Preliminary Report on Patentability and Written Opinion mailed Apr. 25, 2024, for PCT Application No. PCT/US2022/078073, seven pages.
International Preliminary Report on Patentability and Written Opinion mailed May 2, 2024, for PCT Application No. PCT/US2022/078298, twelve pages.
International Search Report and Written Opinion mailed Jan. 11, 2023, for PCT Application No. PCT/US2022/078298, seventeen pages.
International Search Report and Written Opinion mailed Jan. 17, 2023, for PCT Application No. PCT/US2022/078073, thirteen pages.
International Search Report and Written Opinion mailed Jan. 25, 2023, for PCT Application No. PCT/US2022/078063, nineteen pages.
Japanese Office Action mailed May 2, 2024, for JP Application No. 2021-562002, with English translation, sixteen pages.
Notice of Allowance mailed Jun. 5, 2024, for U.S. Appl. No. 18/459,342, filed Aug. 31, 2023, eight pages.
Japanese Final Office Action mailed May 31, 2024, for JP Application No. 2021-551538, with English translation, eighteen pages.
Non-Final Office Action mailed Aug. 26, 2024, for U.S. Appl. No. 18/506,866, filed Nov. 10, 2023, twelve pages.
Non-Final Office Action mailed Aug. 26, 2024, for U.S. Appl. No. 18/418,131, filed Jan. 19, 2024, ten pages.
European Notice of Allowance dated Jul. 15, 2024, for EP Application No. 20791183.5 nine pages.
Japanese Notice of Allowance mailed Aug. 21, 2024, for JP Application No. 2021-562002, with English translation, 6 pages.
Chinese Notice of Allowance dated Feb. 18, 2025, for CN Application No. 202080044362.4, with English translation, 7 pages.
European Search Report dated Jan. 20, 2025, for EP Application No. 24221982.2 nine pages.
Non-Final Office Action mailed Mar. 4, 2025, for U.S. Appl. No. 18/029,355, filed Mar. 29, 2023, ten pages.
Chinese Notice of Allowance dated Nov. 7, 2024, for CN Application No. 201980050714.4, with English translation, 6 pages.
Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page of this reference.
Japanese Notice of Allowance mailed Oct. 28, 2024, for JP Application No. 2021-551538 with English translation, 6 pages.
Japanese Office Action mailed Nov. 7, 2024, for JP Application No. 2023-142856, with English translation, 12 pages.
Notice of Allowance mailed Dec. 11, 2024, for U.S. Appl. No. 18/418,131, filed Jan. 19, 2024, seven pages.
Notice of Allowance mailed Dec. 19, 2024, for U.S. Appl. No. 18/506,866, filed Nov. 10, 2023, five pages.
Non-Final Office Action mailed Jan. 24, 2025, for U.S. Appl. No. 18/510,376, filed Nov. 15, 2023, seventeen pages.
Kaushik, Mayank, et al. "Three Dimensional Microphone and Source Position Estimation Using TDOA and TOF Measurements." 2011 IEEE International Conference on Signal Processing, Communications and Computing (ICSPCC). IEEE, 2011. (Year: 2011).
Final Office Action mailed Sep. 7, 2023, for U.S. Appl. No. 17/214,446, filed Mar. 26, 2021, nineteen pages.
Notice of Allowance mailed Oct. 12, 2023, for U.S. Appl. No. 18/148,221, filed Dec. 29, 2022, five pages.
Notice of Allowance mailed Oct. 17, 2023, for U.S. Appl. No. 17/254,832, filed Dec. 21, 2020, sixteen pages.

\* cited by examiner

IDENTIFYING INPUT FOR SPEECH RECOGNITION ENGINE

CROSS REFERENCE TO RELATED APPLICATION

This application claims the benefit under 35 U.S.C. § 119(e) of U.S. Provisional Patent Application 62/836,593, filed Apr. 19, 2019, the contents of which are incorporated herein by reference in their entireties for all purposes.

FIELD

This disclosure relates in general to systems and methods for processing speech signals, and in particular to systems and methods for processing a speech signal for presentation to a speech recognition engine.

BACKGROUND

Systems for speech recognition are tasked with receiving audio input representing human speech, typically via one or more microphones, and processing the audio input to determine words, logical structures, or other outputs corresponding to that audio input. For example, automatic speech recognition (ASR) systems may generate a text output based on the human speech corresponding to an audio input signal; and natural language processing (NLP) tools may generate logical structures, or computer data, corresponding to the meaning of that human speech. While some ASR systems may operate on a large corpus of speech recorded in advance—as one example, a system tasked with creating a written transcript of a speech that was recorded by a microphone the previous day—some ASR systems must respond to speech input provided in real-time. Real-time speech processing presents ASR systems with a unique set of challenges. For instance, ASR systems typically process speech not as monolithic blocks of input, but as a series of individual words or phrases that carry meaning ("utterances").

Identifying when an utterance begins and ends can be crucial for an ASR system to accurately process a user's input speech and provide a desired result. As an example, consider a real-time "voice assistant" ASR system in communication with a weather reporting service: the ASR system can receive speech input from a user inquiring about the weather (e.g., "What's the current weather?"); convert the speech input into a structured query (e.g., a query for data indicating the past, current, or predicted future weather at a specific date and time, and at a specific location); present the structured query to the weather reporting service; receive the query results from the service; and present the query results to the user. The user expects the ASR system to process his or her complete question (rather than individual fragments of the question), and to promptly provide an accurate response. The user further expects that the ASR system will process naturally spoken commands that need not adhere to a specific, rigid format. In this example system, the onus is on the ASR to, in real-time, identify the user's complete question; and process the question to produce an accurate response in a timely manner—ideally, as soon as the user has finished asking the question.

In this example system, the accuracy of the response may depend on when the ASR system determines the user's question (an utterance) is complete. For instance, a user may ask, "What's the weather tomorrow?" If the ASR system prematurely determines that the utterance is complete after "What's the weather", its corresponding query to the weather service would omit the modifier "tomorrow", and the resulting response would thus be inaccurate (it would not reflect the user's desired date/time). Conversely, if the ASR system takes a more conservative approach, and waits for several seconds to confirm the entire utterance has been completed before processing the utterance, the user may not consider the ASR system to be sufficiently responsive to his or her commands. (Additionally, in some cases, such a long waiting period might create inaccuracies by including unrelated follow-up speech in the utterance.)

ASR systems struggle with this problem of determining, promptly and in real-time, when a speaker's utterance is complete. In some systems, a fixed time-out period is employed to determine the endpoint of an utterance: if, following speech input, no speech is received for the duration of the time-out period (e.g., 750 ms), the speech input may be considered to be the end of an utterance. However, the fixed time-out period solution is imperfect: for example, in situations where a user pauses to formulate a question; where the user is momentarily interrupted; or where the user's speech is otherwise disfluent (e.g., due to anxiety, a speech impediment, environmental distractions, cognitive load, etc.), the time-out period can expire before the user's utterance is complete. And conversely, once the user's utterance is complete, the response is delayed by at least the duration of the time-out period (in which the ASR system confirms no further input is received), and the user cannot provide additional speech input (e.g., belonging to a new utterance) for that duration. Such interactions limit the usefulness of ASR systems, and may highlight, unhelpfully, that the user is communicating with a machine, rather than another human being.

It is desirable for an ASR system to adopt a more intuitive approach to determining when a user has finished providing an utterance. In ordinary face-to-face interactions—and, to a lesser extent, telephonic interactions—people use a variety of contextual cues to understand when another person has finished talking. For example, when a speaker pauses, people evaluate the speaker's prosody, facial expression, eye gaze, mannerisms, gestures, and posture for indications whether the speaker is finished speaking, or has merely paused in the middle of a single thought. ASR systems may use similar cues to identify where a user's utterance begins and ends. As described below, in some examples, an ASR system can identify such contextual cues from microphone input; and in some examples, an ASR system in communication with one or more sensors (e.g., as part of a wearable system) can glean additional speech cues about the speaker from the outputs of those sensors, and use such cues to identify utterance boundaries without the problems, such as described above, associated with conventional solutions.

BRIEF SUMMARY

A method of presenting a signal to a speech recognition engine is disclosed. According to an example of the method, an audio signal is received from a user. A portion of the audio signal is identified, the portion having a first time and a second time. A pause in the portion of the audio signal, the pause comprising the second time, is identified. It is determined whether the pause indicates the completion of an utterance of the audio signal. In accordance with a determination that the pause indicates the completion of the utterance, the portion of the audio signal is presented as input to the speech recognition engine. In accordance with a determination that the pause does not indicate the completion of the utterance, the portion of the audio signal is not presented as input to the speech recognition engine.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
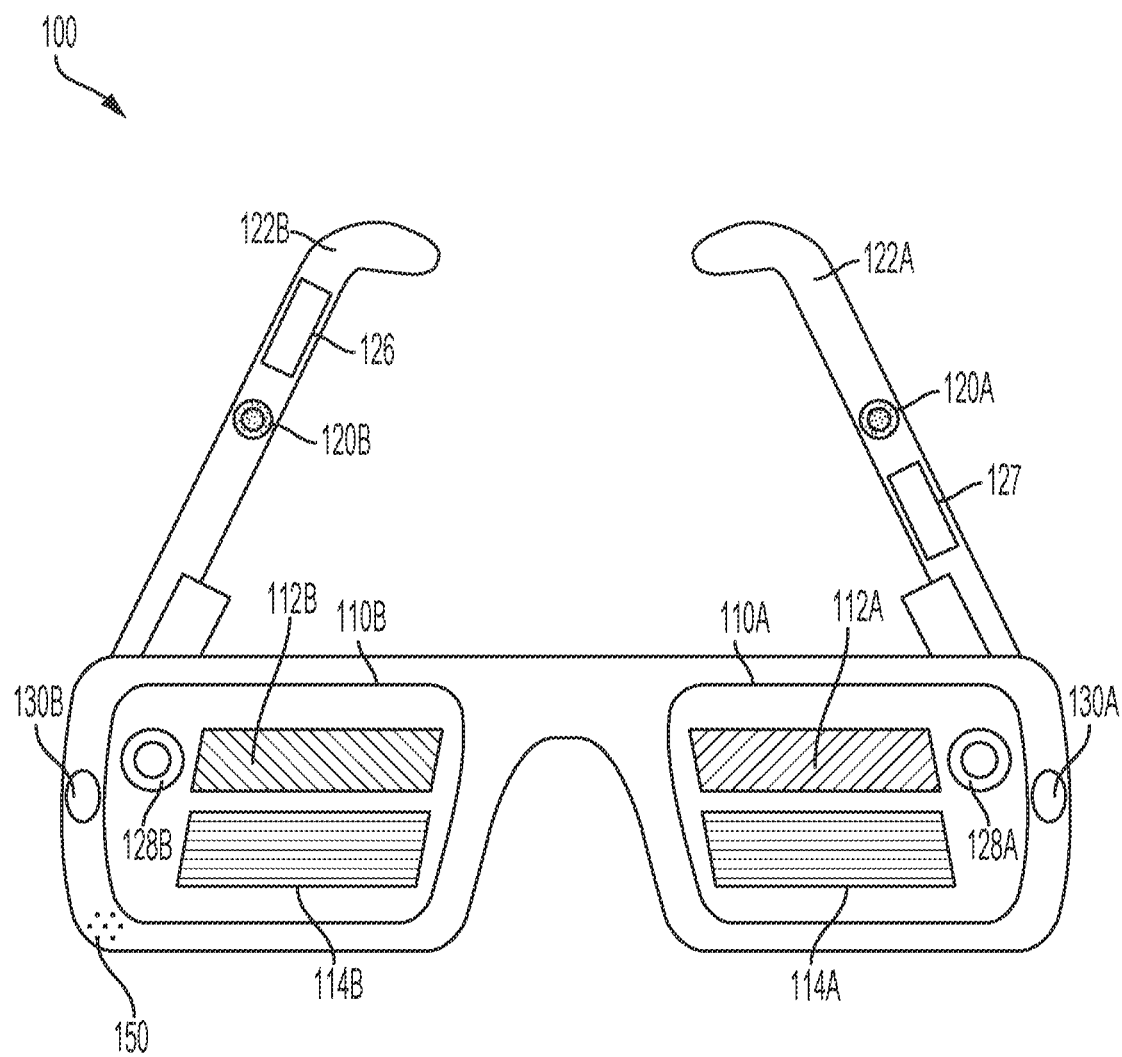
FIG. 1 illustrates an example wearable system according to examples of the disclosure.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMU) (e.g. IMU 126), acoustic sensors (e.g., microphone 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements) (e.g., eye cameras 128 and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned in a wearable head device adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
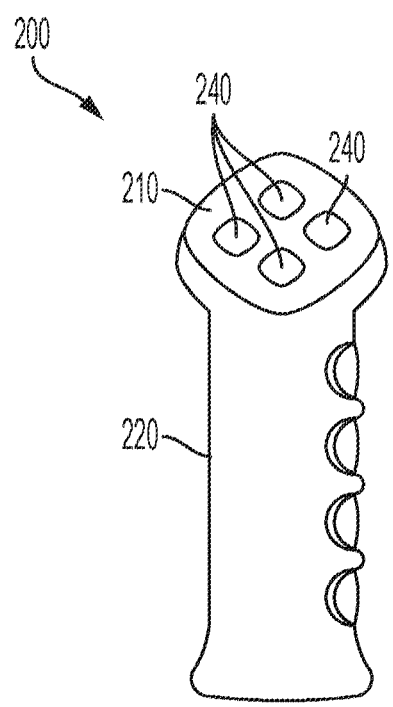
FIG. 2 illustrates an example handheld controller that can be used in conjunction with an example wearable system according to examples of the disclosure.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
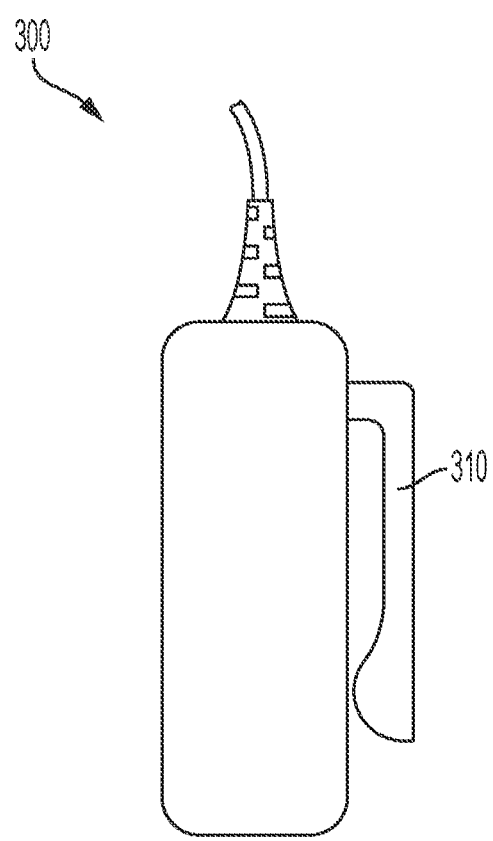
FIG. 3 illustrates an example auxiliary unit that can be used in conjunction with an example wearable system according to examples of the disclosure.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
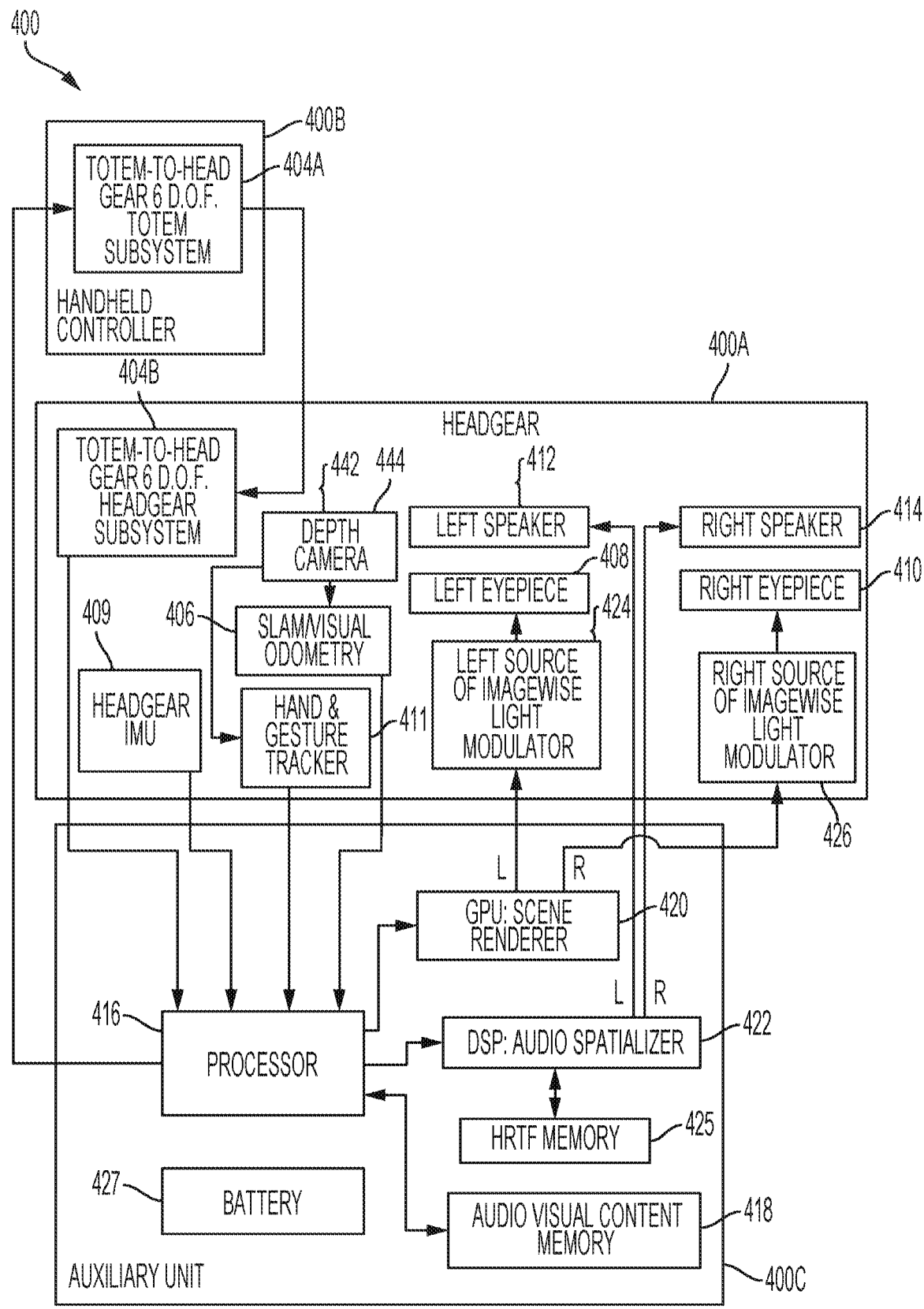
FIG. 4 illustrates an example functional block diagram for an example wearable system according to one or more examples of the disclosure.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6 DOF) totem subsystem 404A. Wearable system 400 can also include example wearable head device 400A (which may correspond to wearable headgear device 100 described above); the wearable head device 400A includes a totem-to-headgear 6 DOF headgear subsystem 404B. In the example, the 6 DOF totem subsystem 404A and the 6 DOF headgear subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the wearable head device 400A; and/or one or more optical targets (e.g., buttons 240 of handheld controller 200 as described above, or dedicated optical targets included in the handheld controller) can be used for 6 DOF tracking. In some examples, the handheld controller 400B can include a camera, as described above; and the headgear 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6 DOF of the handheld controller 400B relative to the wearable head device 400A may be determined. In some examples, 6 DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to wearable head device 400A) to an inertial coordinate space, or to an environmental coordinate space. For instance, such transformations may be necessary for a display of wearable head device 400A to present a virtual object at an expected position and orientation relative to the real environment (e.g., a virtual person sitting in a real chair, facing forward, regardless of the position and orientation of wearable head device 400A), rather than at a fixed position and orientation on the display (e.g., at the same position in the display of wearable head device 400A). This can maintain an illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the wearable head device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of wearable head device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, a microphone 450; and/or the hand gesture tracker 411. The processor 416 can also send and receive control signals from the 6 DOF totem system 404A. The processor 416 may be coupled to the 6 DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to wearable head device 400A and/or handheld controller 400B. Including such components in an auxiliary unit, which can be mounted to a user's waist, can limit the size and weight of wearable head device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with wearable head device 400A or handheld controller 400B. Furthermore, some wearable systems may forgo entirely a handheld controller 400B or auxiliary unit 400C. Such changes and modifications are to be understood as being included within the scope of the disclosed examples.

Speech Recognition Systems

Speech recognition systems in general comprise a speech recognition engine that can accept an input audio signal corresponding to human speech (a source signal); process and analyze the input audio signal; and produce, as a result of the analysis, an output corresponding to the human speech. In the case of automatic speech recognition (ASR) systems, for example, the output of a speech recognition engine may be a text transcription of the human speech. In the case of natural language processing systems, the output may be one or more commands or instructions indicated by the human speech; or some representation (e.g., a logical expression or a data structure) of the semantic meaning of the human speech. Other types of speech processing systems (e.g., automatic translation systems), including those that do not necessarily "recognize" speech, are contemplated and are within the scope of the disclosure. Further, as used herein, a speech recognition engine can include one or more of an automated speech recognition engine, a natural language understanding engine, and other suitable components.

ASR systems are found in a diverse array of products and applications: conventional telephone systems; automated voice messaging systems; voice assistants (including standalone and smartphone-based voice assistants); vehicles and aircraft; desktop and document processing software; data entry; home appliances; medical devices; language translation software; closed captioning systems; and others. An advantage of ASR systems is that they may allow users to provide input to a computer system using natural spoken language, such as presented to a microphone, instead of conventional computer input devices such as keyboards or touch panels; accordingly, speech recognition systems may be particularly useful in environments where conventional input devices (e.g., keyboards) may be unavailable or impractical. Further, by permitting users to provide intuitive voice-based input, speech recognition engines can heighten feelings of immersion. As such, ASR can be a natural fit for wearable systems, and in particular, for virtual reality, augmented reality, and/or mixed reality applications of wearable systems, in which user immersion is a primary goal, and in which it may be desirable to limit the use of conventional computer input devices, whose presence may detract from feelings of immersion.

Identifying Input Speech Boundaries

The effectiveness of an ASR system may be limited by its ability to promptly present accurate input data to a speech recognition engine. Presenting accurate input data may require correctly identifying when individual sequences of input start and end. Some ASR systems struggle to determine, promptly and in real-time, when a speaker's utterance is complete. The present disclosure is directed to systems and methods for improving the accuracy of a speech processing system by accurately identifying the endpoints of utterances presented as input to the speech processing system. Quickly and accurately determining where an utterance ends enables a speech processing system to promptly deliver correct results in real-time—that is, in response to a live stream of input audio, where the entire input audio signal cannot be known in advance.

Figure 5:
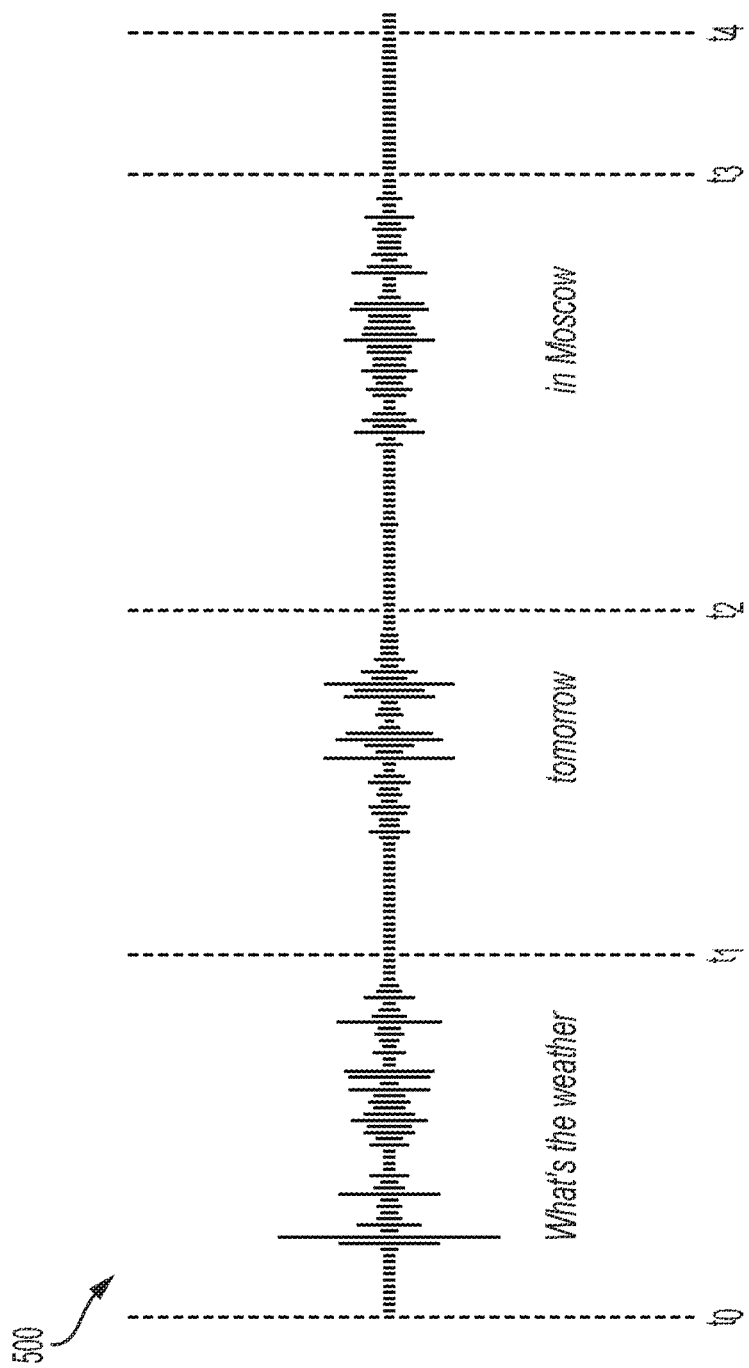
FIG. 5 illustrates an example audio waveform for input to an example ASR system according to one or more examples of the disclosure.

FIG. 5 illustrates an example audio waveform 500, such as may be detected by one or more microphones and presented as input to an ASR system. Waveform 500 represents a user speaking the example utterance "What's the weather tomorrow in Moscow?", with the intention that an ASR system receiving that utterance as input will query a weather service, and respond with tomorrow's weather forecast for Moscow. The speed and accuracy of the ASR system's response will depend on what the ASR system determines to be the endpoint of the user's utterance. Example waveform 500 begins at an initial time $t_0$. If the ASR system determines, prematurely, that the utterance ends at time $t_1$, which falls after the phrase "what's the weather" and before the word "tomorrow", the input utterance (i.e., the input speech falling between time $t_0$ and time $t_1$) will be determined to be "what's the weather". Because this input utterance would lack the qualifiers added by the user (i.e., "tomorrow" and "in Moscow"), the ASR system's response to this utterance will not match the user's expectations. For example, the system might return the current weather (not tomorrow's weather) in the user's current location (not in Moscow). Similarly, if the ASR system determines that the utterance ends at time $t_2$, which falls after the phrase "what's the weather tomorrow" and before the phrase "in Moscow", the input utterance (i.e., the input speech falling between time $t_0$ and time $t_2$) will be determined to be "what's the weather tomorrow", and the resulting response will again not match the user's expectations (tomorrow's weather in Moscow). An ideal ASR system may determine the end of the utterance to be at time $t_3$, which falls immediately after the conclusion of the entire input query, and would correctly identify the input utterance as "what's the weather in Moscow".

The ideal ASR system would also not include trailing portions of the input signal that do not belong to the input utterance. For example, if an ASR system determines that the utterance ends at time $t_4$, the input utterance would include all of the correct input speech (i.e., "what's the weather in Moscow") but would also include extraneous information (the portion of the input speech signal between $t_3$ and $t_4$). This extraneous information could introduce errors into the input utterance, and further, will delay the ASR system's response (i.e., by at least the span of processing time of the signal between $t_3$ and $t_4$), resulting in a perceived lack of responsiveness by the user.

Some ASR systems may incorrectly identify the endpoint of an input utterance. For instance, when presented with example waveform 500 as input, some ASR systems may incorrectly identify the end of the utterance as $t_1$, $t_2$, or $t_4$, rather than $t_3$.

Figure 6:
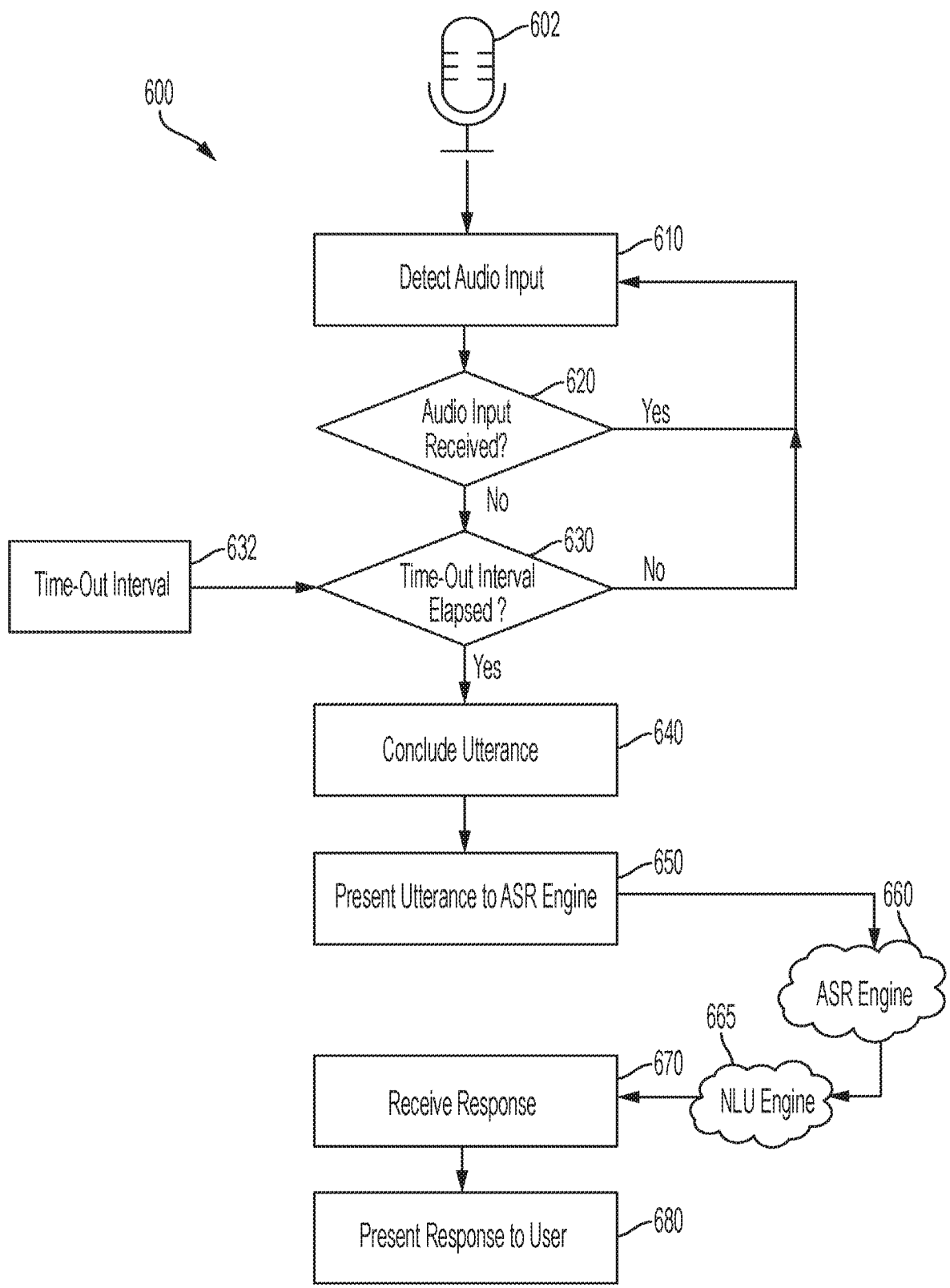
FIG. 6 illustrates a flow chart of an example of processing an acoustic speech signal using an ASR system according to one or more examples of the disclosure.

FIG. 6 illustrates an example process 600 that may be executed by an ASR system. Example process 600 uses a time-out interval to determine when an input utterance has concluded; that is, when input speech has not been received for an amount of time exceeding the time-out interval, the utterance is deemed complete and is presented to an ASR engine for processing. As shown in the figure, input speech is detected in real-time at stage 610 from one or more microphones 602. At stage 620, process 600 determines whether input speech is still being received; if so, the input utterance is deemed ongoing, and process 600 returns to stage 610 to continue detecting the input speech. If not, process 600 queries whether a time-out interval 632 has elapsed. If not, process 600 returns to stage 610; if so, the utterance is deemed complete (stage 640). At stage 650, process 600 then presents the utterance (or some representation of the utterance) to an ASR engine 660 for processing. The ASR engine 660 can generate a speech-to-text representation of the input utterance. A natural language understanding (NLU) engine 665 can perform additional processing based on the representation. For example, the NLU engine 665 can generate a semantic representation of the speech-to-text representation output from the ASR engine 660; determine that the input utterance represents a request for a weather report; query a weather reporting service using a structured query generated from the input utterance; and receive a response from the weather reporting service. In some embodiments, process 600 may stream the utterance (or some representation of the utterance) for processing (e.g., by the ASR engine 660). In some embodiments, the ASR engine 660 may return or output incremental results. In some embodiments, the NLU engine 665 may receive the output from the ASR engine 660 for processing after a conclusion of the utterance. At stage 670, process 600 can receive the response from the NLU engine 665, and at stage 680 present the response to the user (e.g., via a text-to-speech engine coupled to an output speaker).

The above process 600 may be prone to error because, by concluding an input utterance at stages 630 and 640 using a simple time-out interval, process 600 can prematurely conclude an utterance before the user has completed speaking the utterance. With reference to waveform 500 described above, this may result in the input utterance terminating at time $t_1$ or $t_2$ rather than $t_3$. This may happen when the user inadvertently inserts gaps of non-speech between two words of a single utterance (e.g., pauses between "weather" and "tomorrow" or between "tomorrow" and "in Moscow" in the example waveform 500). If these gaps exceed the length of the time-out interval 632, process 600 may prematurely determine that the input utterance has completed, even though the user is still completing that utterance. (This situation may be especially common with complex input queries, where the user may need additional time to formulate their question; or among users with speech impediments, or those who experience anxiety when interacting with microphones or ASR systems.)

The problem may not be completely solvable simply by increasing the length of the time-out interval 632, because there is a tradeoff between the duration of this interval and the perceived responsiveness of the ASR system. That is, even if the time-out interval 632 can be increased such that it exceeds any possible intra-utterance input gap—preventing process 600 from prematurely cutting off an input utterance—the ASR system waits for the duration of that extended time-out interval before determining that the utterance has concluded. This delay can annoy the user, who may perceive the delay as non-responsiveness—particularly in comparison to face-to-face human interaction, in which listeners quickly and intuitively understand when a speaker is finished speaking. In some embodiments, the delay may lead to cross-talk—when a user perceives the ASR system to be unresponsive and begins speaking again (e.g., to reiterate the initial input)—which may result in a cascade of errors.

Figure 7:
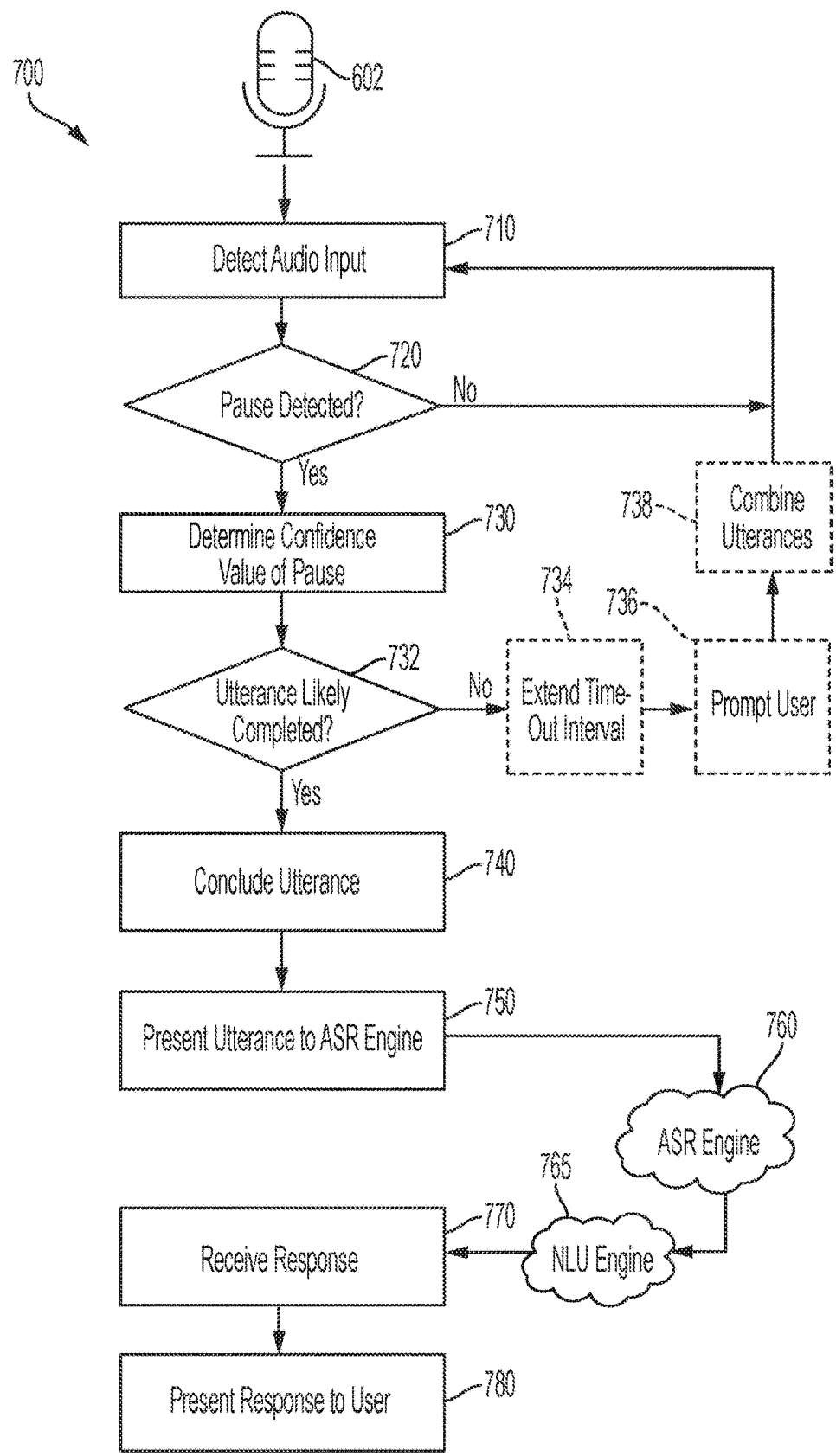
FIG. 7 illustrates a flow chart of an example of processing an acoustic speech signal using an ASR system according to one or more examples of the disclosure.

FIG. 7 illustrates an example process 700 (e.g., which may be executed by an ASR system) that can identify an input utterance more promptly and accurately than can process 600. In process 700, as described below, a pause in input speech can be detected, and then analyzed for contextual cues to indicate whether the pause likely represents the completion of the current utterance (in which case the utterance can be concluded and presented to an ASR engine and a NLU engine), or whether the pause indicates that the current utterance is ongoing (in which case the ASR system should continue detecting the current utterance).

In process 700, audio input presented by a user is detected at stage 710 from one or more microphones 602. (In some examples, audio input can be received as streaming data, or as one or more data files, instead of or in addition to microphone output.) This audio input can be stored in an input buffer, or other memory, for access by process 700. At stage 720, process 700 can determine (for example, based on the input buffer and/or sensor data as described in more detail below) whether the user has paused while presenting the input speech. If no pause is detected, indicating that the user's current utterance is ongoing, the process can return to stage 710 to continue detecting the audio input. If a pause is detected at stage 720, process 700 can determine at stage 730 the likelihood that the pause indicates the completion of the current utterance (rather than the continuation of the current utterance). For example, stage 720 can determine a numeric confidence value, representing the likelihood that the pause indicates the current utterance is complete. This determination can be made based on the contents of the input buffer and/or sensor data, as described in more detail below.

At stage 732, process 700 can evaluate the determination, at stage 730, whether the detected pause indicates the completion of the current utterance. If it has been determined with a sufficient confidence (e.g., with a confidence level that exceeds a threshold) that the pause indicates the completion of the current utterance, process 700 can proceed to conclude the utterance (stage 740); present the utterance (stage 750) to an ASR engine (760); receive a response (stage 770) from a NLU engine (765); and present the response to the user (stage 780). These steps may correspond to stage 640, stage 650, ASR engine 660, NLU engine 665, stage 670, and stage 680, respectively, described above with respect to process 600.

If process 700 determines that the pause does not likely indicate the current utterance has been completed (e.g., that a determined confidence level does not meet a threshold value), process 700 at stage 732 can take various actions in response. In some examples, process 700 can adjust or reset (stage 734) a parameter used to determine whether a pause is detected, such as described herein with respect to stage 720. For instance, process 700 at stage 734 can increase, or reset, a time-out interval used at stage 720 to detect a pause in input speech. This may be beneficial if process 700 determines that more time is needed to determine whether the user intends to complete the current utterance. In some examples, process 700 can present the user with a prompt (stage 736), such as a prompt for additional input (e.g., a visual and/or audible prompt that asks the user to indicate whether they are done speaking). This can be beneficial in situations where it is unclear whether the current utterance is completed—for example, where process 700 returns a confidence value less than, but close to, the threshold value. In some examples, upon detecting that the pause does not indicate the current utterance is completed, process 700 can combine the current utterance with a second utterance (stage 738); for instance, an utterance preceding the pause could be concatenated with a second utterance following the pause, for presentation of the combined utterances to a speech recognition engine (e.g., the ASR engine and/or NLU engine). In some examples, process 700 may return to stage 710 to continue detecting input speech, without taking any additional action such as described with respect to stages 734, 736, or 738; this behavior may be preferred where stage 730 returns a confidence value that is far below the threshold required to conclude that the current utterance is complete.

Figure 8A:
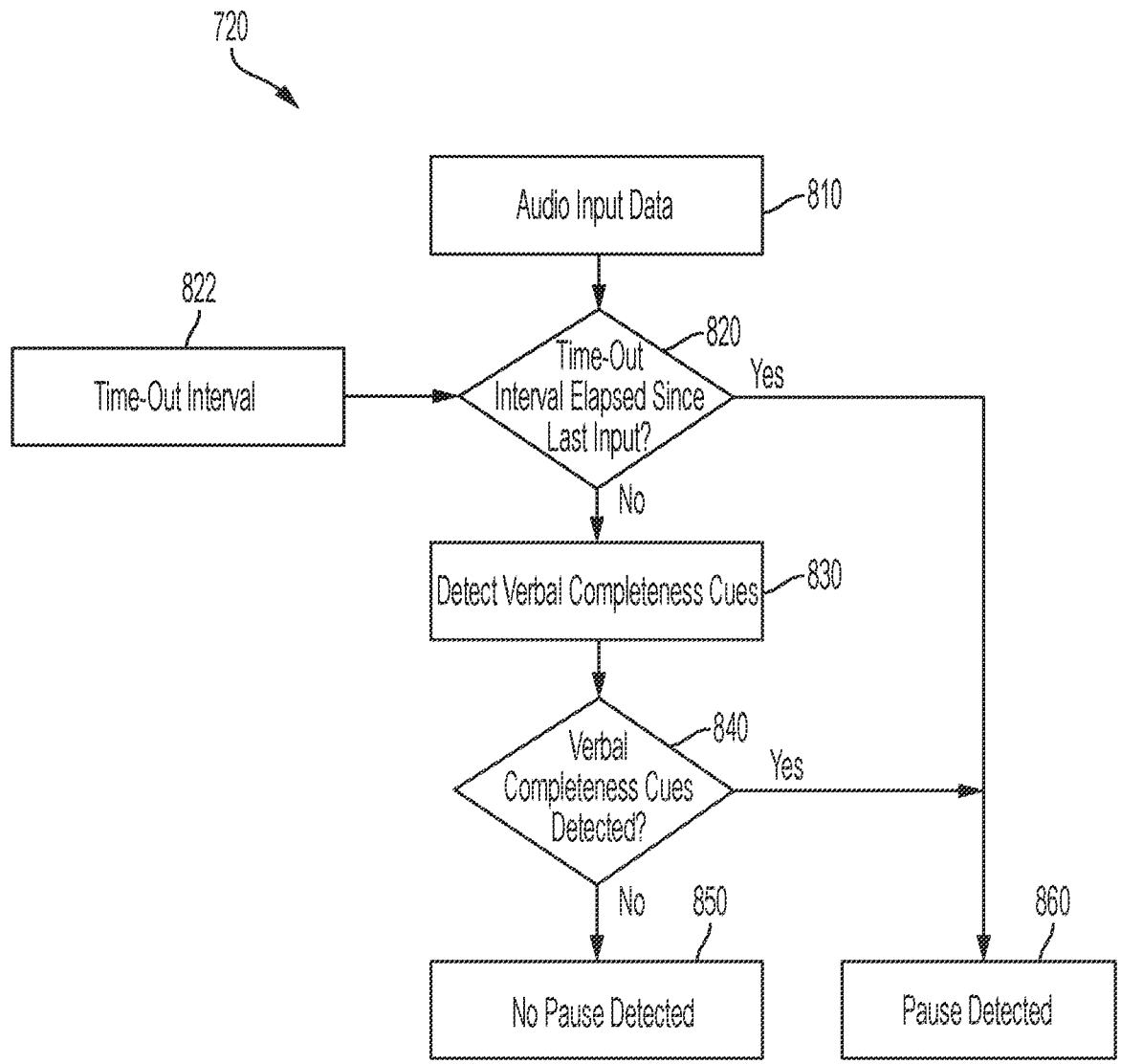
FIGS. 8A-8B illustrate flow charts of examples of detecting a pause in an input speech signal according to one or more examples of the disclosure.

FIG. 8A illustrates a flow chart of an example process for implementing stage 720 of process 700, such as described above with respect to FIG. 7. In the figure, audio input data 810 (e.g., speech input signals stored in an input buffer) can be evaluated to determine the presence of a pause in the input. At stage 820, the process can determine whether a value of one or more properties of an input signal is above or below a threshold for a period of time exceeding a time-out interval. In some examples, whether an amplitude of the input signal has been below a threshold amplitude level for a period of time exceeding the time-out interval may be determined. If so, this can indicate a pause in the user's input speech (stage 860), such as described above with respect to FIG. 6. In some embodiments, the length of the time-out interval may vary depending on the property. In some examples, spectral analysis can identify a speech signal as distinct from other ambient or incidental sounds, and whether an output of the analysis has been above or below one or more thresholds for a period of time exceeding the time-out interval may be determined.

However, even if it is determined at stage 820 that the time-out interval 822 has not elapsed, the process can examine audio input data 810 (stage 830) to determine whether the speech data includes verbal cues (other than relative silence) that indicate a pause in the input speech. These verbal cues can include characteristics of the user's prosody (e.g., rhythm, intonation, timbre, volume), the presence of trailing words, the presence of terminating words or phrases (e.g., "thank you" when completing a verbal request), and the like. These verbal cues can indicate that the current utterance is complete, even if the time-out interval has not yet elapsed. At stage 840, the process can evaluate whether any such verbal cues exist, and if so, whether they indicate that the input speech has paused (stage 860) or not (stage 850). In some cases, stage 840 can make this determination by comparing a confidence level generated at stage 830 against a threshold value. By evaluating the presence of verbal cues to indicate that an utterance has completed, even before the expiration of a time-out interval, the process can avoid perceptions of non-responsiveness, such as described above, that can result from waiting for the conclusion of the time-out interval before presenting the utterance for processing (e.g., by an ASR engine and/or NLU engine).

Figure 8B:
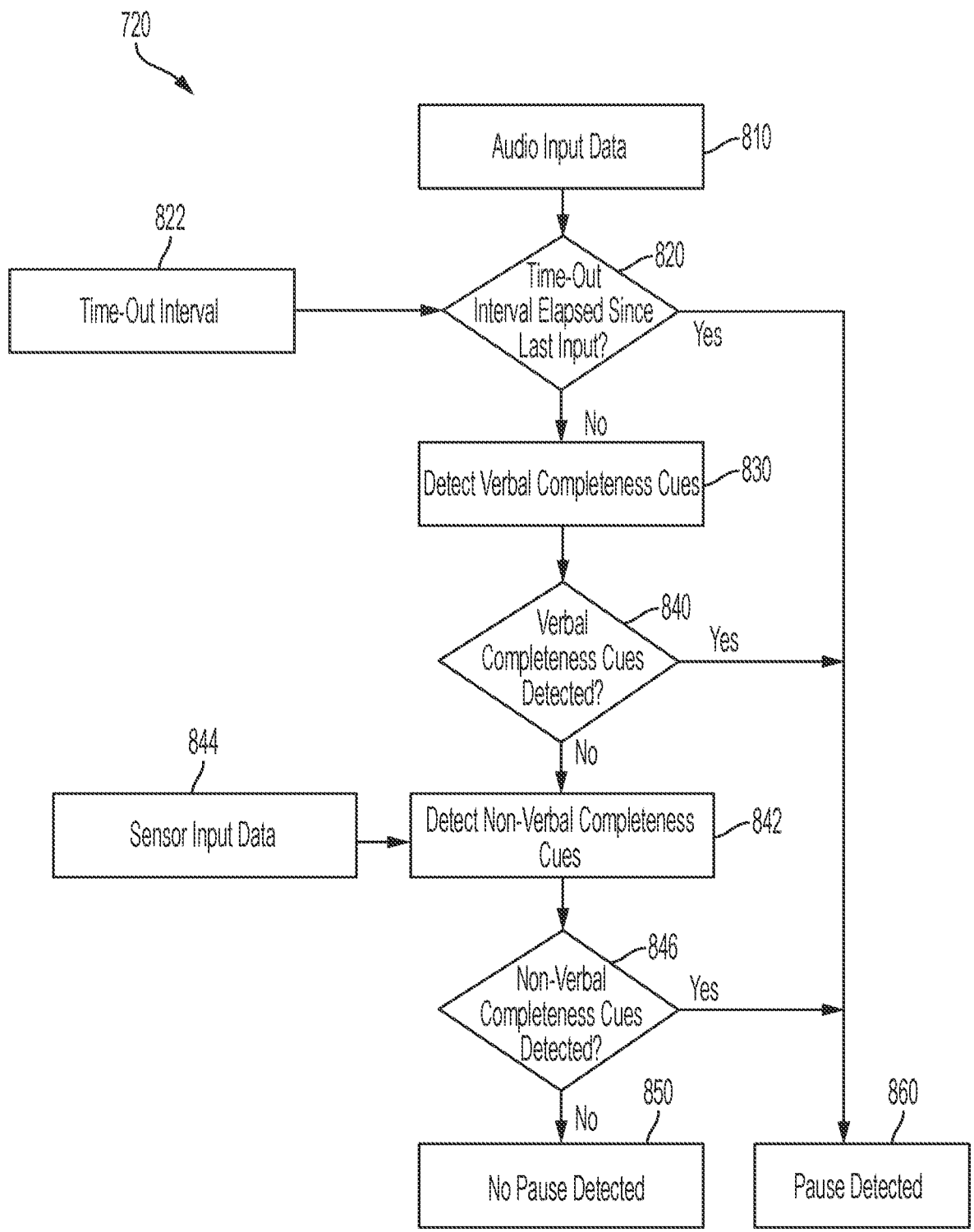

FIG. 8B illustrates a flow chart of an example process for implementing stage 720 of process 700 in which sensor input data 844 is used, instead of or in conjunction with audio input data 810 such as described above. In some examples, as described above, sensor input data 844 can correspond to data from sensors such as described above with respect to example wearable head device 100 in FIG. 1. As described above, such a wearable system can include one or more sensors that can provide input about the user and/or the environment of the wearable system. For instance, wearable head device 100 can include a camera (e.g., camera 444 described in FIG. 4) to output visual signals corresponding to the environment; in some examples, the camera can be a forward-facing camera on a head-mounted unit that shows what is currently in front of the user of the wearable system. In some examples, wearable head device 100 can include a LIDAR unit, a radar unit, and/or acoustic sensors, which can output signals corresponding to the physical geometry (e.g., walls, physical objects) of the user's environment. In some examples, wearable head device 100 can include a GPS unit, which can indicate geographic coordinates corresponding to the wearable system's current location. In some examples, wearable head device 100 can include an accelerometer, a gyroscope; and/or an inertial measurement unit (IMU) to indicate an orientation of the wearable head device 100. In some examples, wearable head device 100 can include environmental sensors, such as temperature or pressure sensors. In some examples, wearable head device 100 can include biometric sensors, such as iris cameras; fingerprint sensors; eye tracking sensors (e.g., electrooculography (EOG) sensors) to measure a user's eye movements or eye gaze; or sensors to measure a user's vital signs. In examples where wearable head device 100 includes a head-mounted unit, such orientation can correspond to an orientation of the user's head (and, by extension, the user's mouth and a direction of the user's speech). Other suitable sensors can be included and can provide sensor input data 844. Moreover, in some examples, sensors other than those of a wearable system can be utilized as appropriate. For instance, sensors associated with a microphone of a speech recognition system (e.g., GPS, IMU) could be used to in conjunction with sensors of a wearable system to determine a relative distance and orientation between the user and the speech recognition system.

At stage 842, process 800 can examine sensor input data 844 to determine whether the sensor data includes non-verbal cues that indicate a pause in the input speech. These non-verbal cues can include, for example, characteristics of the user's eye gaze; head pose; gestures; vital signs (e.g., breathing patterns, heart rate); and facial expression. These non-verbal cues can indicate that the current utterance is complete, even if the time-out interval has not yet elapsed, and even in the absence of verbal cues such as described above with respect to FIG. 8A. For instance, a pause in a user's speech might correspond with a change in the user's eye gaze target, a change in the user's head pose, a gesture performed by the user, a change in the user's vital signs (e.g., breathing pattern, heart rate), a change in the user's facial expression, a change in movement or rotation away from a microphone, a change in the user's posture or other physical characteristics indicated by sensor input data 844, a change in orientation, and/or a rate of change of any one or more of the aforementioned characteristics. At stage 846, the process can evaluate whether any such non-verbal cues exist, and if so, whether they indicate that the input speech has paused (stage 860) or not (stage 850). In some cases, stage 846 can make this determination by comparing a confidence level generated at stage 842 against a threshold value. As above, by evaluating the presence of non-verbal cues to indicate that an utterance has completed, even before the expiration of a time-out interval, the process can avoid perceptions of non-responsiveness, such as described above, that can result from waiting for the conclusion of the time-out interval before presenting an utterance to a speech recognition engine. While FIG. 8B shows verbal cues and non-verbal cues being analyzed in separate stages (i.e., stages 840 and 846), some examples can analyze verbal cues and non-verbal cues in combination, in a single stage.

Figure 9A:
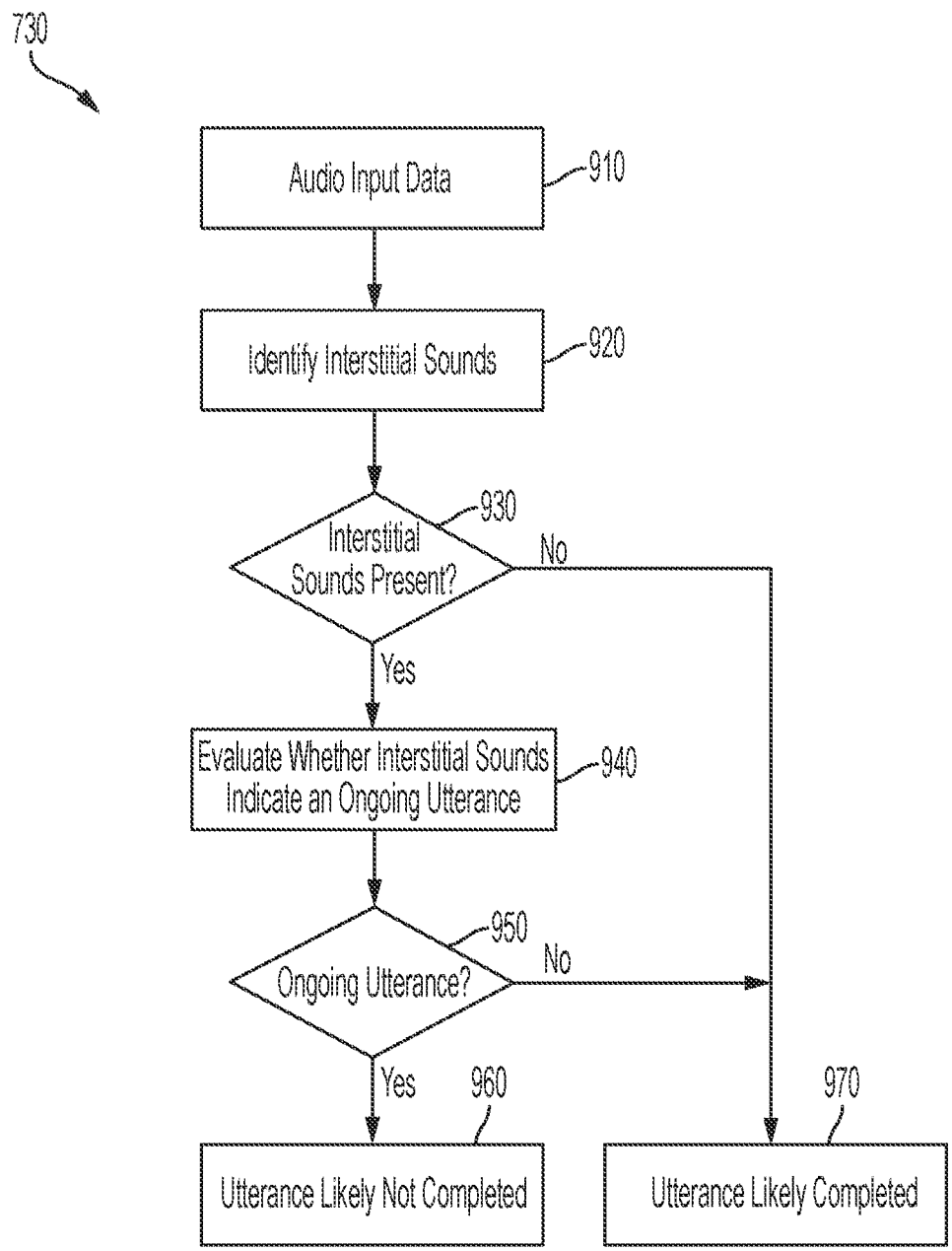
FIGS. 9A-9B illustrate flow charts of examples of determining whether an input utterance has concluded according to one or more examples of the disclosure.

FIG. 9A illustrates a flow chart of an example process for implementing stage 730 of process 700, such as described above with respect to FIG. 7. At stage 730, process 700 determines, for a pause identified at stage 720 such as described above, whether or not the pause likely corresponds to the conclusion of the current utterance. In FIG. 9A, audio input data 910 (e.g., speech signals stored in an input buffer, which may correspond to 810 described above) can be evaluated at stage 920 to determine the presence of interstitial sounds in the audio input data. Interstitial sounds may be words, phrases, syllables, or other vocalizations present in the input audio that can indicate that the current utterance is not yet complete (such as where the user is mid-thought). For example, interstitial sounds can include hesitation sounds (e.g., "um," "uh"); elongated syllables (e.g., an elongated "to(ooo)" at the end of the phrase "I'm going to"); repetitions (e.g., "and, and, and . . . "); trailing filler words (e.g., "like," "I mean"), and/or other indications that the user is likely to provide additional input audio belonging to the current utterance. Such interstitial sounds can be specific to individual users, to particular languages, or types of verbal input (e.g., questions, declarative statements). As described below, various classifiers can be employed to identify interstitial sounds.

At stage 930, the process can determine whether any such interstitial sounds were detected at stage 920. If not, the process can conclude (stage 970) that the current utterance is completed. If interstitial sounds are present, the process at stage 940 can evaluate whether the interstitial sounds indicate that the current utterance is ongoing. For example, the presence of hesitation sounds can indicate that the user is in the process of formulating a complete utterance (as in, for instance, "What's the weather . . . uh . . . tomorrow"). Similarly, elongated syllables, repetitions, filler words, and other interstitial sounds can indicate that the current utterance is not yet complete. In some examples, stage 940 can generate a confidence value, indicating the likelihood that interstitial sounds are present and indicate whether the current utterance is or is not complete.

At stage 950, if it is determined at stage 940 that the current utterance is ongoing, the process can conclude (stage 960) that the current utterance is not completed. As described above with respect to FIG. 7, this can result in the process performing various actions in response: for example, process 700 can extend a time-out interval (e.g., 822) in which to detect a pause, prompt the user for additional input indicating whether the current utterance is complete, and/or combine the current utterance with a second utterance; or take no action at all. In some examples, which action (if any) is performed can depend on a confidence value generated at stage 940; for instance, in response to a high confidence value that the utterance is not yet completed, process 700 may merely return to stage 710 to continue detecting audio input, without taking any further action; and in response to a medium confidence value (indicating, e.g., uncertainty regarding whether the current utterance is complete), process 700 may expressly prompt the user for additional input (stage 736). Similarly, if it is determined at stage 940 that the current utterance is completed, the process can indicate so (stage 970), and the process can proceed to present the utterance to a speech recognition system, such as described above.

Figure 9B:
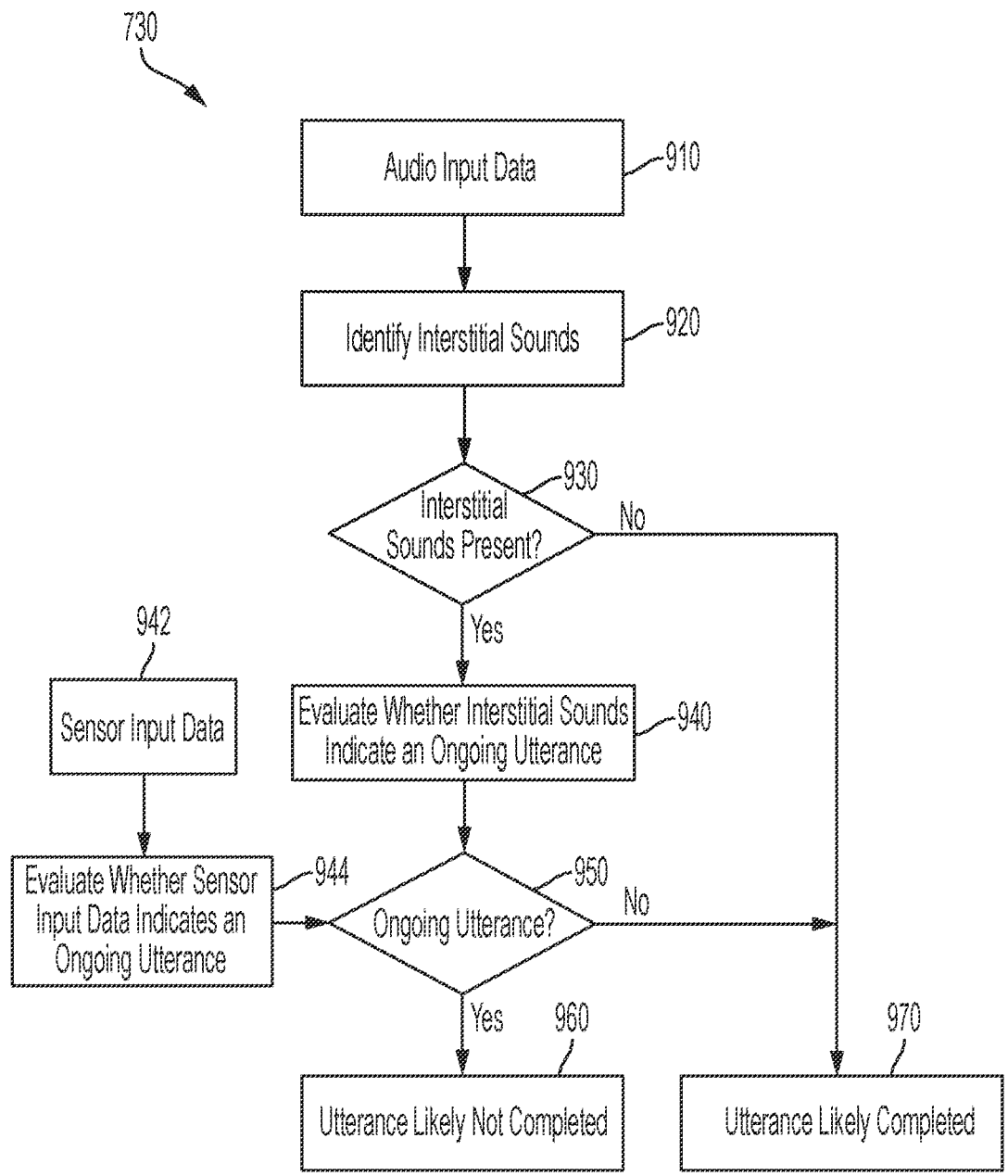

FIG. 9B illustrates a flow chart of an example process for implementing stage 730 of example process 700 in which sensor input data 942 is used, instead of or in conjunction with audio input data 910 such as described above. Sensor input data 942 can correspond to sensor input data 844 described above: for example, sensor input data 942 can be output by sensors such as described above with respect to example wearable head device 100 in FIG. 1. As described above, such sensors can include one or more cameras (e.g., RGB cameras, depth cameras); LIDAR units; radar units; acoustic sensors; GPS units; accelerometers; gyroscopes; IMUs; environmental sensors; biometric sensors (e.g., iris cameras, fingerprint sensors, eye tracking sensors, and/or sensors to measure a user's vital signs). Other suitable sensors can be included and can provide sensor input data 942. Moreover, in some examples, sensors other than those of a wearable system can be utilized as appropriate. For instance, as described above, sensors associated with a microphone of a speech recognition system (e.g., GPS, IMU) could be used to in conjunction with sensors of a wearable system to determine a relative distance and orientation between the user and the speech recognition system.

With respect to FIG. 9B, sensor input data 942 can be evaluated at stage 944 to determine whether the sensor data indicates that the current utterance is ongoing, or whether the current utterance is completed. For instance, the completion (or non-completion) of an utterance might correspond with a change in the user's eye gaze target, a change in the user's head pose, a gesture performed by the user, a change in the user's vital signs (e.g., breathing pattern, heart rate), a change in the user's facial expression, a change in movement or rotation away from a microphone, a change in the user's posture or other physical characteristics indicated by sensor input data 944, a change in orientation, and/or a rate of change of any one or more of the aforementioned characteristics. In some examples, stage 944 may generate a confidence level, indicating a likelihood with which the current utterance is completed. Based on the determination made at stage 944 (e.g., by comparison of the confidence level to a threshold value), the process at stage 950 can indicate that the utterance either is (stage 970) or is not (stage 960) completed.

In process 700 described above, input data (e.g., audio data, sensor data) can be evaluated at one or more stages for its significance with respect to how data should be presented to a speech recognition engine (e.g., the ASR engine and/or the NLU engine). For instance, at stage 830 of process 720, as described above, audio input data can be evaluated to determine whether the data includes verbal cues that the current utterance is complete. At stage 842, as described above, sensor data can be evaluated for non-verbal cues (e.g. changes in facial expression) that the current utterance is complete. At stage 920, as described above, audio input data can be evaluated to identify the presence of interstitial sounds; and at stage 940, it can be evaluated whether those interstitial sounds indicate that the current utterance is ongoing. And at stage 944, as described above, sensor input data can be evaluated to determine whether the sensor input data indicates that the current utterance is ongoing.

Figure 10:
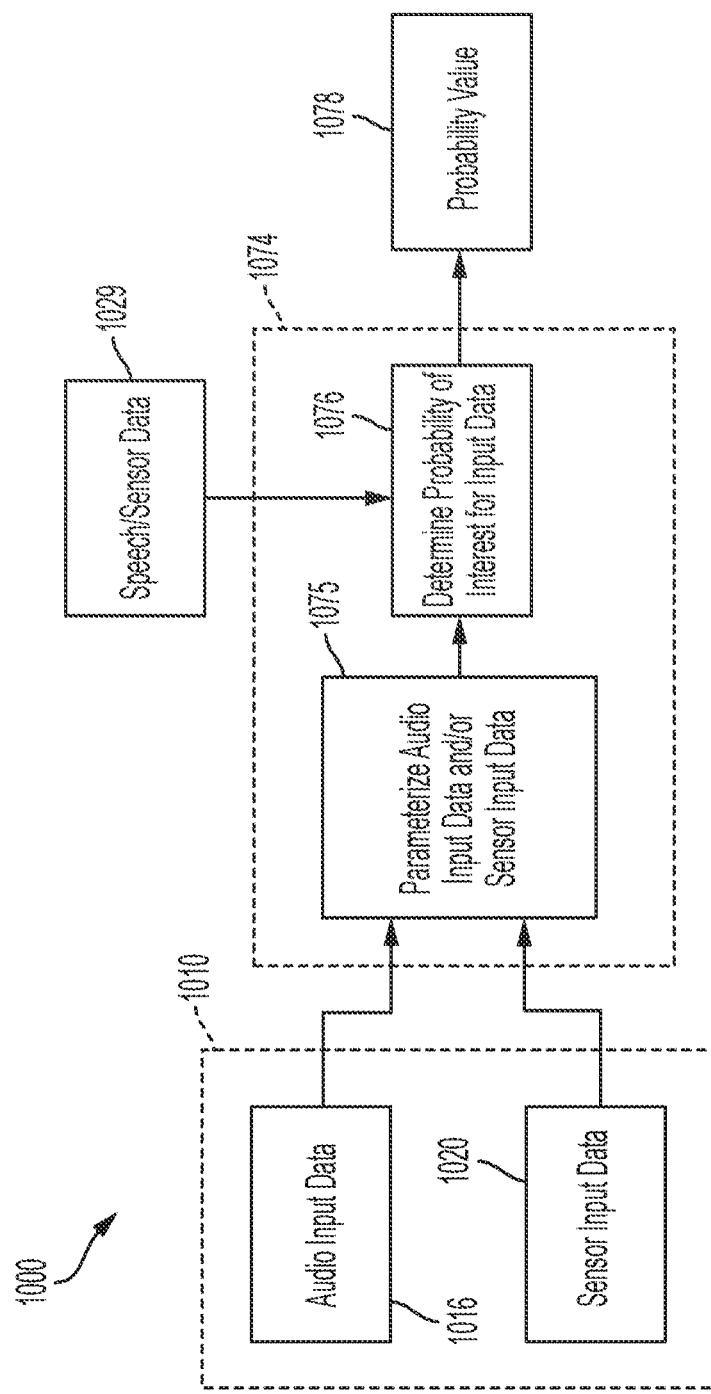
FIG. 10 illustrates a flow chart of an example of classifying input data to determine a probability associated with that input data according to one or more examples of the disclosure.

In some examples, audio input data and/or sensor input data used as described above can be classified according to one or more parameters—resulting in one or more classifiers representing the data. These classifiers can be used (e.g., by example process 700) to evaluate the significance of that data (e.g., a probability associated with the data). FIG. 10 illustrates an example process 1000 for classifying input data 1010 to determine a probability of interest associated with that input data. As used herein, a probability of interest can correspond to a probability described above with respect to example process 700: a probability that audio input data and/or sensor input data indicates a pause in input speech; a probability that a pause indicates the completion of an utterance; and/or a probability that the presence of interstitial sounds indicates that an utterance is ongoing; or another suitable probability. With respect to FIG. 10, this determination can be performed using audio input data 1016, alone or in combination with sensor input data 1020. Determining a probability value for input data 1010 can be referred to as "classifying" the input data 1010, and a module or process for performing this determination (e.g., 1074) can be referred to as a "classifier."

In the example process shown in FIG. 10, input data 1010 (e.g., audio input data 1016 and/or sensor input data 1020) can be used in conjunction with speech/sensor data 1029 (e.g., from a database) to determine one or more probabilities of interest for input data 1010. In some examples, audio input data 1016 and/or sensor input data 1020 can be parameterized/characterized according to one or more parameters at stage 1075 in order to facilitate classifying the speech segment based on speech/sensor data 1029. A Fourier transform of the input data 1010 can be performed in order to provide a spectral representation of the input data 1010 (e.g., a function of frequency indicating the relative prevalence of various frequency parameters in audio input data 1016 and/or sensor input data 1020). For instance, this process can identify levels of (or changes in) amplitude or component frequencies of a user's speech, position, eye gaze, and/or body movements; these values can be indicative of a pause in the user's speech, the presence of interstitial sounds, or the conclusion of an utterance of the user, such as described above. In some examples, characteristics of the user—for example, the user's age, sex, and/or native language—can be used as parameters to characterize the input data 1010. Other ways in which input data 1010 can be parameterized, with such parameters used to determine a probability of interest of the input data, will be apparent to those skilled in the art.

At stage 1076 of the example, a probability value 1078 is determined for a probability of interest of input data 1010. In some examples, probability value 1078 can be determined using speech/sensor data 1029, such as where a database including speech/sensor data 1029 identifies, for elements of speech and/or sensor data in the database, whether those elements correspond to input speech. In some examples, audio input data 1016 can include a set of audio waveforms corresponding to speech segments; and can indicate, for each waveform, whether the corresponding speech segment indicates a pause or an interstitial sound. In some examples, instead of or in addition to audio waveforms, audio input data 1016 can include audio parameters that correspond to the speech segments. Audio input data 1016 can be compared with the speech segments of speech/sensor data 1029—for example, by comparing an audio waveform of audio input data 1016 with analogous waveforms of speech/sensor data 1029, or by comparing parameters of audio input data 1016 (such as may be characterized at stage 1075) with analogous parameters of speech/sensor data 1029. Based on such comparisons, probability value 1078 can be determined for audio input data 1016.

Analogous techniques can be applied with respect to sensor input data 1020. For example, sensor input data 1020 can include sequences of raw sensor data; and can indicate, for the raw sensor data, whether that data indicates a pause, or the completion or continuation of an utterance. Similarly, sensor input data 1020 can include sensor input parameters that correspond to the sensor data. Sensor input data 1020 can be compared with elements of speech/sensor data 1029 such as described above with respect to audio input data 1016.

Techniques for determining probability 1078 based on input data 1010 will be familiar to those skilled in the art. For instance, in some examples, nearest neighbor interpolation can be used at stage 1076 to compare elements of input data 1010 to similar data elements in an N-dimensional space (in which the N dimensions can comprise, for example, audio parameters, audio waveform data, sensor parameters, or raw sensor data described above); and to determine probability value 1078 based on the relative distances between an element of input data 1010 and its neighbors in the N-dimensional space. As another example, support vector machines can be used at stage 1076 to determine, based on speech/sensor database 1029, a basis for classifying an element of input data 1010 as either indicating an utterance is complete or indicating the utterance is not complete; and for classifying input data 1010 (e.g., determining a probability value 1078 that input data 1010 indicates a completed utterance, a pause, or the presence of interstitial sounds) according to that basis. Other suitable techniques for analyzing input data 1010 and/or speech/sensor data 1029, comparing input data 1010 to speech/sensor data 1029, and/or classifying input data 1010 based on speech/sensor data 1029 in order to determine probability 1078 will be apparent; the disclosure is not limited to any particular technique or combination of techniques.

In some examples, machine learning techniques can be used, alone or in combination with other techniques described herein, to determine probability value 1078. For example, a neural network could be trained on speech/sensor data 1029, and applied to input data 1010 to determine probability value 1078 for that input data. As another example, a genetic algorithm can be used to determine a function, based on speech/sensor data 1029, for determining probability value 1078 corresponding to input data 1010. Other suitable machine learning techniques, which will be familiar to those skilled in the art, will be apparent; the disclosure is not limited to any particular technique or combination of techniques.

In some examples, speech/sensor data 1029 can be generated by recording a set of speech data and/or sensor data for various users, and identifying, for elements of that data, whether the user has completed an utterance; has paused his or her speech; or is providing interstitial sounds. For instance, a user could be observed interacting with a group of people, with a speech recognition system present in the same room, as the user's speech is recorded; sensor data for the user (e.g., output by a wearable system worn by the user) can also be recorded. The observer can identify, for each region of the recorded data, whether that region of data corresponds to pausing, providing interstitial sounds, or completing an utterance. This information can be apparent to the observer by observing the context in which the user is speaking—commonly, it is easy and intuitive for humans (unlike machines) to determine, based on an observation of a user, whether the user has completed an utterance. This process can be repeated for multiple users until a sufficiently large and diverse set of speech/sensor data is generated.

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to a microphone) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech recognition engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
    receiving, via a microphone and a first processor of a head-wearable device, an audio signal, wherein the audio signal comprises voice activity;
    dividing, via the first processor, the audio signal into a plurality of audio signal segments;
    receiving, via the first processor and one or more sensors of the head-wearable device, non-verbal sensor data corresponding to a user of the head-wearable device, wherein:
        the one or more sensors comprise a camera,
        the receiving the non-verbal sensor data comprises receiving, via the camera, information associated with an environment of the user concurrently with the receiving the audio signal,
        the information indicates a position and an orientation of the user, and
        the information is determined based on one or more of Simultaneous Localization and Mapping (SLAM) and visual odometry performed via the first processor and further via visual data from the camera;
    classifying, via a first classifier, audio data corresponding to the audio signal;
    for each of the plurality of the audio signal segments:
        determining, via the first processor, one or more of an amplitude and frequency components of a respective audio signal segment;
        receiving, via a second processor, the respective audio signal segment of the plurality of the audio signal segments and data associated with one or more of the amplitude and the frequency components of the respective audio signal segment;
        determining, via the second processor and based on one or more of the amplitude and the frequency components of the respective audio signal segment, whether the respective audio signal segment comprises a pause in the voice activity;
    responsive to determining that the respective audio signal segment comprises a pause in the voice activity, determining, based on the classifying of the audio data, whether the pause in the voice activity corresponds to an end point of the voice activity; and
    responsive to determining that the pause in the voice activity corresponds to an end point of the voice activity, presenting a response to the user based on the voice activity, wherein:
    determining whether the respective audio signal segment comprises the pause in the voice activity comprises:
        determining, based on the information determined based on the one or more of SLAM and visual odometry, head poses of the user associated with the respective audio signal segment, and
        determining whether the head poses comprise a head pose change, wherein the respective audio signal segment comprises the pause in accordance with a determination that the head poses comprise the head pose change, and
    determining whether the pause in the voice activity corresponds to an end point of the voice activity comprises:
        determining a probability of interest based on the classifying of the audio data and based further on applying the non-verbal sensor data as input to a machine learning process, the probability determined based on relative distances between the non-verbal sensor data and its neighbors in an N-dimensional space,
        determining whether the probability of interest exceeds a threshold,
        in accordance with a determination that the probability of interest exceeds the threshold, determining that the pause in the voice activity corresponds to an end point of the voice activity, and
        in accordance with a determination that the probability of interest does not exceed the threshold, prompting the user to speak, and
    presenting the response to the user comprises presenting the response via a transmissive display of the head-wearable device, concurrently with presenting to the user a view of an external environment via the transmissive display.

2. The method of claim 1 further comprising:
    in accordance with the determination that the probability of interest does not exceed the threshold:

determining that the pause in the voice activity does not corresponding to an end point of the voice activity, and forgoing presenting the response to the user based on the voice activity.

3. The method of claim 1, wherein determining whether the respective audio signal segment comprises a pause in the voice activity further comprises determining whether the amplitude of the respective audio signal segment falls below a second threshold for a predetermined period of time.

4. The method of claim 1 further comprising:
in accordance with the determination that the probability of interest does not exceed the threshold:
determining that the pause in the voice activity does not correspond to an end point of the voice activity, and
determining whether the audio signal comprises a second pause corresponding to an end point of the voice activity.

5. The method of claim 1, wherein determining whether the respective audio signal segment comprises a pause in the voice activity further comprises determining whether the respective audio signal segment comprises one or more verbal cues corresponding to an end point of the voice activity.

6. The method of claim 5, wherein the one or more verbal cues comprise a characteristic of the user's prosody.

7. The method of claim 5, wherein the one or more verbal cues comprise a terminating phrase.

8. The method of claim 1, wherein the non-verbal sensor data is indicative of the user's gaze.

9. The method of claim 1, wherein the non-verbal sensor data is indicative of the user's facial expression.

10. The method of claim 1, wherein the non-verbal sensor data is indicative of the user's heart rate.

11. The method of claim 1, wherein determining whether the pause in the voice activity corresponds to an end point of the voice activity comprises identifying one or more interstitial sounds.

12. The method of claim 1, wherein the machine learning process comprises one or more of an artificial neural network, a genetic algorithm, a nearest neighbor interpolation, and a support vector machine.

13. The method of claim 1, further comprising: further in accordance with a determination that the probability of interest does not exceed the threshold, comparing a confidence value to a second threshold, the confidence value indicative of whether the voice activity is complete;
wherein prompting the user to speak is performed further in accordance with a determination that the confidence value does not exceed the second threshold.

14. The system of claim 1, wherein the probability of interest is determined via the second processor.

15. The method of claim 1, wherein the first classifier is configured to classify the audio data into a first class indicating a pause, a second class indicating a completed utterance, and a third class indicating a presence of an interstitial sound.

16. A system comprising:
a microphone of a head-wearable device;
one or more sensors of the head-wearable device;
a transmissive display of the head-wearable device; and
one or more processors, the one or more processor comprising a first processor of the head-wearable device and a second processor, configured to execute a method comprising:
receiving, via the microphone and the first processor of the head-wearable device, an audio signal, wherein the audio signal comprises voice activity;
dividing, via the first processor, the audio signal into a plurality of audio signal segments;
receiving, via the first processor and the one or more sensors of the head-wearable device, non-verbal sensor data corresponding to a user of the head-wearable device, wherein:
the one or more sensors comprise a camera,
the receiving the non-verbal sensor data comprises receiving, via the camera, information associated with an environment of the user concurrently with the receiving the audio signal,
the information indicates a position and an orientation of the user, and
the information is determined based on one or more of Simultaneous Localization and Mapping (SLAM) and visual odometry performed via the first processor and further via visual data from the camera;
classifying, via a first classifier, audio data corresponding to the audio signal;
for each of the plurality of the audio signal segments:
determining, via the first processor, one or more of an amplitude and frequency components of a respective audio signal segment;
receiving, via a second processor, the respective audio signal segment of the plurality of the audio signal segments and data associated with one or more of the amplitude and the frequency components of the respective audio signal segment;
determining, via the second processor and based on one or more of the amplitude and the frequency components of the respective audio signal segment, whether the respective audio signal segment comprises a pause in the voice activity;
responsive to determining that the respective audio signal segment comprises a pause in the voice activity, determining, based on the classifying of the audio data, whether the pause in the voice activity corresponds to an end point of the voice activity; and
responsive to determining that the pause in the voice activity corresponds to an end point of the voice activity, presenting a response to the user based on the voice activity, wherein:
determining whether the respective audio signal segment comprises the pause in the voice activity comprises:
determining, based on the information determined based on the one or more of SLAM and visual odometry, head poses of the user associated with the respective audio signal segment, and
determining whether the head poses comprise a head pose change, wherein the respective audio signal segment comprises the pause in accordance with a determination that the head poses comprise the head pose change, and
determining whether the pause in the voice activity corresponds to an end point of the voice activity comprises:
determining a probability of interest based on the classifying of the audio data and based further on applying the non-verbal sensor data as input to a machine learning process, the probability determined based on relative distances between the non-verbal sensor data and its neighbors in an N-dimensional space,
determining whether the probability of interest exceeds a threshold, in accordance with a determination that the probability of interest exceeds the threshold, determining that the pause in the voice activity corresponds to an end point of the voice activity, and in accordance with a determination that the probability of interest does not exceed the threshold, prompting the user to speak, and presenting the response to the user comprises presenting the response via the transmissive display, concurrently with presenting to the user a view of an external environment via the transmissive display.

17. The system of claim 16 further comprising:
in accordance with the determination that the probability of interest does not exceed the threshold:
determining that the pause in the voice activity does not correspond to an end point of the voice activity, and
forgoing presenting the response to the user based on the voice activity.

18. The system of claim 16, wherein determining whether the respective audio signal segment comprises a pause in the voice activity further comprises determining whether the amplitude of the respective audio signal segment falls below a second threshold for a predetermined period of time.

19. The system of claim 16 further comprising:
in accordance with the determination that the probability of interest does not exceed the threshold:
determining that the pause in the voice activity does not correspond to an end point of the voice activity, and
determining whether the audio signal comprises a second pause corresponding to an end point of the voice activity.

20. The system of claim 16, wherein determining whether the respective audio signal segment comprises a pause in the voice activity further comprises determining whether the respective audio signal segment comprises one or more verbal cues corresponding to an end point of the voice activity.

21. The system of claim 20, wherein the one or more verbal cues comprise a characteristic of the user's prosody.

22. The system of claim 20, wherein the one or more verbal cues comprise a terminating phrase.

23. The system of claim 16, wherein the non-verbal sensor data is indicative of the user's gaze.

24. The system of claim 16, wherein the non-verbal sensor data is indicative of the user's facial expression.

25. The system of claim 16, wherein the non-verbal sensor data is indicative of the user's heartrate.

26. The system of claim 16, wherein determining whether the pause in the voice activity corresponds to an end point of the voice activity comprises identifying one or more interstitial sounds.

27. The system of claim 16, wherein the machine learning process comprises one or more of an artificial neural network, a genetic algorithm, a nearest neighbor interpolation, and a support vector machine.

28. The system of claim 16, wherein the method further comprises:
further in accordance with a determination that the probability of interest does not exceed the threshold, comparing a confidence value to a second threshold, the confidence value indicative of whether the voice activity is complete;
wherein prompting the user to speak is performed further in accordance with a determination that the confidence value does not exceed the second threshold.

29. A non-transitory computer-readable medium storing one or more instructions, which, when executed by one or more processors of an electronic device, cause the device to perform a method comprising:
receiving, via a microphone and a first processor of a head-wearable device, an audio signal, wherein the audio signal comprises voice activity;
dividing, via the first processor, the audio signal into a plurality of audio signal segments;
receiving, via the first processor and one or more sensors of the head-wearable device, non-verbal sensor data corresponding to a user of the head-wearable device, wherein:
the one or more sensors comprise a camera,
the receiving the non-verbal sensor data comprises receiving, via the camera, information associated with an environment of the user concurrently with the receiving the audio signal;
the information indicates a position and an orientation of the user, and
the information is determined based on one or more of Simultaneous Localization and Mapping (SLAM) and visual odometry performed via the first processor and further via visual data from the camera;
classifying, via a first classifier, audio data corresponding to the audio signal;
for each of the plurality of the audio signal segments:
determining, via the first processor, one or more of an amplitude and frequency components of a respective audio signal segment;
receiving, via a second processor, the respective audio signal segment of the plurality of the audio signal segments and data associated with one or more of the amplitude and the frequency components of the respective audio signal segment;
determining, via the second processor and based on one or more of the amplitude and the frequency components of the respective audio signal segment, whether the respective audio signal segment comprises a pause in the voice activity;
responsive to determining that the respective audio signal segment comprises a pause in the voice activity, determining, based on the classifying of the audio data, whether the pause in the voice activity corresponds to an end point of the voice activity; and
responsive to determining that the pause in the voice activity corresponds to an end point of the voice activity, presenting a response to the user based on the voice activity, wherein:
determining whether the respective audio signal segment comprises the pause in the voice activity comprises:
determining, based on the information determined based on the one or more of SLAM and visual odometry, head poses of the user associated with the respective audio signal segment, and
determining whether the head poses comprise a head pose change, wherein the respective audio signal segment comprises the pause in accordance with a determination that the head poses comprise the head pose change, and
determining whether the pause in the voice activity corresponds to an end point of the voice activity comprises:
determining a probability of interest based on the classifying of the audio data and based further on applying the non-verbal sensor data as input to a machine learning process, the probability determined based on relative distances between the non-verbal sensor data and its neighbors in an N-dimensional space, determining whether the probability of interest exceeds a threshold, in accordance with a determination that the probability of interest exceeds the threshold, determining that the pause in the voice activity corresponds to an end point of the voice activity, and in accordance with a determination that the probability of interest does not exceed the threshold, prompting the user to speak, and presenting the response to the user comprises presenting the response via a transmissive display of the head-wearable device, concurrently with presenting to the user a view of an external environment via the transmissive display.

30. The non-transitory computer-readable medium of claim 29, the method further comprising:
in accordance with the determination that the probability of interest does not exceed the threshold:
determining that the pause in the voice activity does not correspond to an end point of the voice activity, and
forgoing presenting the response to the user based on the voice activity.

31. The non-transitory computer-readable medium of claim 29, wherein determining whether the respective audio signal segment comprises a pause in the voice activity further comprises determining whether the amplitude of the respective audio signal segment falls below a second threshold for a predetermined period of time.

32. The non-transitory computer-readable medium of claim 29, the method further comprising:
in accordance with the determination that the probability of interest does not exceed the threshold:
determining that the pause in the voice activity does not correspond to an end point of the voice activity, and
determining whether the audio signal comprises a second pause corresponding to an end point of the voice activity.

33. The non-transitory computer-readable medium of claim 29, wherein determining whether the respective audio signal segment comprises a pause in the voice activity further comprises determining whether the respective audio signal segment comprises one or more verbal cues corresponding to an end point of the voice activity.

34. The non-transitory computer-readable medium of claim 33, wherein the one or more verbal cues comprise a characteristic of the user's prosody.

35. The non-transitory computer-readable medium of claim 33, wherein the one or more verbal cues comprise a terminating phrase.

36. The non-transitory computer-readable medium of claim 29, wherein the non-verbal sensor data is indicative of the user's gaze.

37. The non-transitory computer-readable medium of claim 29, wherein the non-verbal sensor data is indicative of the user's facial expression.

38. The non-transitory computer-readable medium of claim 29, wherein the non-verbal sensor data is indicative of the user's heartrate.

39. The non-transitory computer-readable medium of claim 29, wherein determining whether the pause in the voice activity corresponds to an end point of the voice activity comprises identifying one or more interstitial sounds.

40. The non-transitory computer-readable medium of claim 29, wherein the machine learning process comprises one or more of an artificial neural network, a genetic algorithm, a nearest neighbor interpolation, and a support vector machine.

41. The non-transitory computer-readable medium of claim 29, wherein the method further comprises: further in accordance with a determination that the probability of interest does not exceed the threshold, comparing a confidence value to a second threshold, the confidence value indicative of whether the voice activity is complete;
wherein prompting the user to speak is performed further in accordance with a determination that the confidence value does not exceed the second threshold.

* * * * *

UNITED STATES PATENT AND TRADEMARK OFFICE
CERTIFICATE OF CORRECTION

Page 1 of 1

PATENT NO. : 12,327,573 B2
APPLICATION NO. : 16/850965
DATED : June 10, 2025
INVENTOR(S) : Anthony Robert Sheeder and Tushar Arora It is certified that error appears in the above-identified patent and that said Letters Patent is hereby corrected as shown below:

In the Claims

At Column 19, Claim number 14, Line number 50, please delete "system" and insert --method--.

Signed and Sealed this
Fourteenth Day of October, 2025

John A. Squires
*Director of the United States Patent and Trademark Office*